United States Patent
Takano

(10) Patent No.: US 11,284,222 B2
(45) Date of Patent: Mar. 22, 2022

(54) COMMUNICATION APPARATUS, COMMUNICATION METHOD, AND PROGRAM FOR COMMUNICATING WITH DIRECTIONAL BEAMS

(71) Applicant: Sony Corporation, Tokyo (JP)

(72) Inventor: Hiroaki Takano, Saitama (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/770,075

(22) PCT Filed: Oct. 11, 2018

(86) PCT No.: PCT/JP2018/038009
§ 371 (c)(1),
(2) Date: Jun. 5, 2020

(87) PCT Pub. No.: WO2019/116703
PCT Pub. Date: Jun. 20, 2019

(65) Prior Publication Data
US 2021/0243567 A1    Aug. 5, 2021

(30) Foreign Application Priority Data
Dec. 14, 2017 (JP) .............................. JP2017-239547

(51) Int. Cl.
*H04W 4/06* (2009.01)
*H04W 16/28* (2009.01)
(Continued)

(52) U.S. Cl.
CPC ............. *H04W 4/06* (2013.01); *H04W 16/28* (2013.01); *H04W 24/10* (2013.01); *H04W 68/005* (2013.01)

(58) Field of Classification Search
CPC . H04W 40/048; H04W 68/055; H04W 16/28; H04W 4/06; H04W 4/08
See application file for complete search history.

(56) References Cited

U.S. PATENT DOCUMENTS 10,763,937 B2 *   9/2020   Kusano ............... H04L 27/2692
10,917,158 B2 *   2/2021   Islam ..................... H01Q 1/245
(Continued)

FOREIGN PATENT DOCUMENTS

EP          3726874 A1 *  10/2020 ............ H04W 16/28
JP          2017-157908 A    9/2017
(Continued)

OTHER PUBLICATIONS

A Survey of Device-to-Device Communications: Research Issues and Challenges by Furqan Jameel • Zara Hamid • Farhana Jabeen • Sherali Zeadally • Muhammad Awais Javed Published in: IEEE Communications Surveys & Tutorials (vol. 20, Issue: 3, pp. 2133-2168) Aug. 2018 (Year: 2018).*

(Continued)

*Primary Examiner* — William D Cumming
(74) *Attorney, Agent, or Firm* — Xsensus LLP

(57) ABSTRACT

A communication apparatus and corresponding method for performing wireless communication, to include controlling delivery of content for plural programs using a directional beam, and notifying a terminal apparatus of first information regarding a timing of transmitting the directional beam in each of a plurality of directions in association with second information notified commonly to one or more of the terminal apparatuses within a communication range.

19 Claims, 23 Drawing Sheets

(51) Int. Cl.
  *H04W 24/10* (2009.01)
  *H04W 68/00* (2009.01)

(56) References Cited

U.S. PATENT DOCUMENTS

| | | | | |
|---|---|---|---|---|
| 2017/0346543 | A1* | 11/2017 | Islam | H04W 40/248 |
| 2019/0334604 | A1* | 10/2019 | Kusano | H04B 7/088 |
| 2021/0243567 | A1* | 8/2021 | Takano | H04W 16/28 |

FOREIGN PATENT DOCUMENTS

| | | | | |
|---|---|---|---|---|
| WO | 2010/059085 | A1 | 5/2010 | |
| WO | 2017/204559 | A1 | 11/2017 | |
| WO | 2017/204931 | A1 | 11/2017 | |
| WO | WO-2019142440 | A1 * | 7/2019 | H04W 4/08 |

OTHER PUBLICATIONS

E. Gures, I. Shayea, A. Alhammadi, M. Ergen and H. Mohamad, "A Comprehensive Survey on Mobility Management in 5G Heterogeneous Networks: Architectures, Challenges and Solutions," in IEEE Access, vol. 8, pp. 195883-195913, 2020, doi: 10.1109/ACCESS.2020.3030762. Oct. 2020 (Year: 2020).*
Mediatek Inc: "Further Considerations on NR 'Cell'", 3GPP Draft; R2-166103, 3rd Generation Partnership Project (3GPP), vol. RAN WG2, No. Kaohsiung, Taiwan; Oct. 10, 2016-Oct. 14, 2016, Oct. 9, 2016 (Oct. 9, 2016), XP051150722, URL: http://www.3gpp.org/ftp/Meetings_3GPP_SYNC/RAN2/Docs/.
Huawei et al.: "Idle mode mobility in NR", 3GPP Draft; R2-1701802 Idle Mode Mobility in NR, 3rd Generation Partnership Project (3GPP), vol. RAN WG2, No. Athens, Greece; Feb. 13, 2017-Feb. 17, 2017 Feb. 12, 2017 (Feb. 12, 2017), XP051212368, URL: http://www.3gpp.org/ftp/Meetings 3GPPSYNC/RAN2/Docs/.
Extended European Search Report dated Jan. 19, 2021, in corresponding European Patent Application No. 18889879.5.
International Search Report and Written Opinion dated Dec. 18, 2018 for PCT/JP2018/038009 filed on Oct. 11, 2018, 9 pages including English Translation of the International Search Report.
Alcatel Shanghai Bell and Alcatel-Lucent, "Beam-forming for single-cell E-MBMS in LTE-A," 3GPP TSG RAN WG1 Meeting #55, R1-084135, Prague, Czech Republic, Nov. 10-14, 2008, pp. 1-12.
Sony, "Considerations on Beam Reporting in RACH Procedure," 3GPP TSG-RAN WG1 Meeting #91, R1-1720454, Reno, USA, Nov. 27-Dec. 1, 2017, 3 pages.

* cited by examiner

M1(3GPP TS36.445)

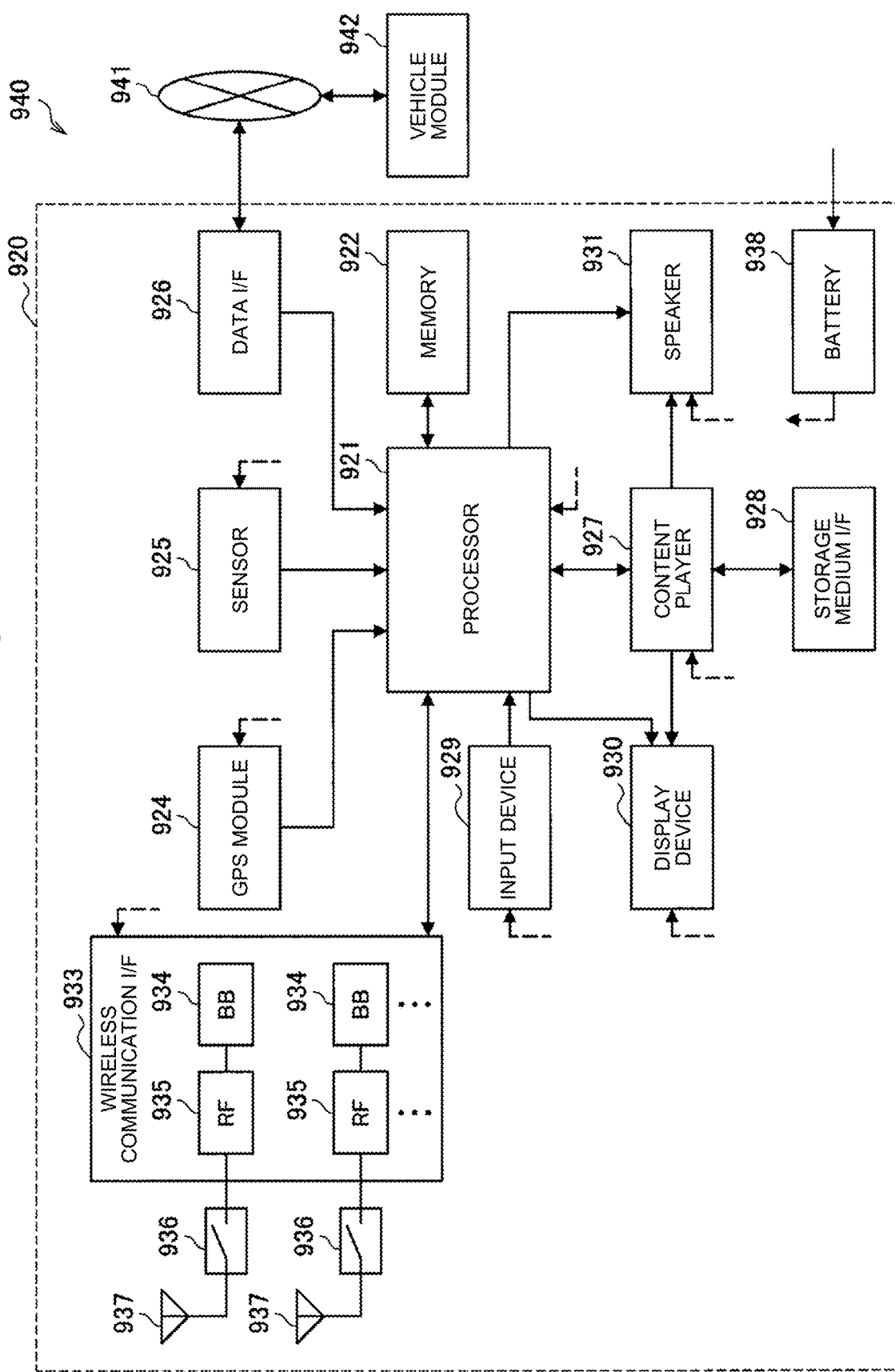

COMMUNICATION APPARATUS, COMMUNICATION METHOD, AND PROGRAM FOR COMMUNICATING WITH DIRECTIONAL BEAMS

CROSS-REFERENCE TO RELATED APPLICATIONS

The present application is based on PCT filing PCT/JP2018/038009, filed Oct. 11, 2018, which claims priority to JP 2017-239547, filed Dec. 14, 2017, the entire contents of each are incorporated herein by reference.

FIELD

The present disclosure relates to a communication apparatus, a communication method, and a program.

BACKGROUND

Wireless access schemes and wireless networks of cellular mobile communication (hereinafter also referred to as "Long Term Evolution (LTE)", "LTE-Advanced (LTE-A)", "LTE-Advanced Pro (LTE-A Pro)", "New Radio (NR)", "New Radio Access Technology (NRAT)", "Evolved Universal Terrestrial Radio Access (EUTRA)", or "Further EUTRA (FEUTRA)") are under review in 3rd Generation Partnership Project (3GPP). Further, in the following description, LTE includes LTE-A, LTE-A Pro, and EUTRA, and NR includes NRAT and FEUTRA. In LTE and NR, a base station device (base station) is also referred to as an evolved Node B (eNodeB), a terminal apparatus (a mobile station, a mobile station device, or a terminal) is also referred to as a user equipment (UE). LTE and NR are cellular communication systems in which a plurality of areas covered by a base station device is arranged in a cell form. A single base station device may manage a plurality of cells.

In a fifth-generation (5G) mobile communication system following LTE/LTE-A, technology using a directional beam for communication between a base station and a terminal apparatus is being studied. The use of such technology allows communication between a base station and a terminal apparatus to achieve spatial multiplexing in addition to time and frequency multiplexing. In one example, Patent Document 1 discloses an example of a technique using a directional beam for communication between a base station and a terminal apparatus.

Further, as the technology for delivering content such as text, music, still images, and moving images to each terminal apparatus using the above-described wireless network, a technology called multimedia broadcast and multicast service (MBMS) is studied. The use of the MBMS technology makes it possible to efficiently deliver the above-mentioned various types of content that are broadcast as a program to a plurality of terminal apparatuses via the wireless network.

Further background may be discerned from the following document;
Patent Literature 1: JP 2017.457908 A.

SUMMARY

Technical Problem

On the other hand, in the fifth-generation (5G) mobile communication system, data is transmitted to each terminal apparatus while a beam having directivity (also referred to hereinafter as a "directional beam") is swept, and so the technique of delivering content to each terminal apparatus within the communication range is different from the communication using a non-directional beam. Thus, even in a situation where a directional beam is used for communication, the technology such as MBMS capable of efficiently delivering content provided as a so-called program (broadcasting program) to each terminal apparatus is desirable to be applicable more suitably.

Thus, the present disclosure provides technology enabling the delivery of content to a terminal apparatus using a directional beam to be achieved more suitably.

Solution to Problem

According to the disclosure, a communication apparatus is provided that includes: a communication unit configured to perform wireless communication; a control unit configured to control delivery of content for each program using a directional beam; and a notification unit configured to notify a terminal apparatus of first information regarding a timing of transmitting the directional beam in each of a plurality of directions in association with second information notified commonly to one or more of the terminal apparatuses within a communication range.

Moreover, according to the disclosure, a communication apparatus is provided that includes: a communication unit configured to perform wireless communication; an acquisition unit configured to acquire, from a base station, second information associated with first information regarding a timing of transmitting a directional beam used for delivering content for each program in each of a plurality of directions, the second information being notified commonly to one or more terminal apparatuses within a communication range of the base station; and a control unit configured to controls in such a way as to receive the content for each program on a basis of the acquired first information.

Moreover, according to the disclosure, a communication method executed by a computer, the method is provided that includes: performing wireless communication; controlling delivery of content for each program using a directional beam; and notifying a terminal apparatus of first information regarding a timing of transmitting the directional beam in each of a plurality of directions in association with second information notified commonly to one or more of the terminal apparatuses within a communication range.

Moreover, according to the disclosure, a communication method executed by a computer, the method is provided that includes: performing wireless communication; acquiring, from a base station, second information associated with first information regarding a timing of transmitting a directional beam used for delivering content for each program in each of a plurality of directions, the second information being notified commonly to one or more terminal apparatuses within a communication range of the base station; and controlling in such a way as to receive the content for each program on a basis of the acquired first information.

Moreover, according to the disclosure, a program is provided that causes a computer to execute: performing wireless communication; controlling delivery of content for each program using a directional beam; and notifying a terminal apparatus of first information regarding a timing of transmitting the directional beam in each of a plurality of directions in association with second information notified commonly to one or more of the terminal apparatuses within a communication range.

A program is provided that causes a computer to execute: performing wireless communication; acquiring, from a base station, second information associated with first information regarding a timing of transmitting a directional beam used for delivering content for each program in each of a plurality of directions, the second information being notified commonly to one or more terminal apparatuses within a communication range of the base station; and controlling in such a way as to receive the content for each program on a basis of the acquired first information.

Advantageous Effects of Invention

According to the present disclosure as described above, the technology is provided that enables the delivery of content to the terminal apparatus using the directional beam to be achieved more suitably.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 24 is a block diagram illustrating an example of a schematic configuration of a car navigation apparatus.

DESCRIPTION OF EMBODIMENTS

Figure 1:
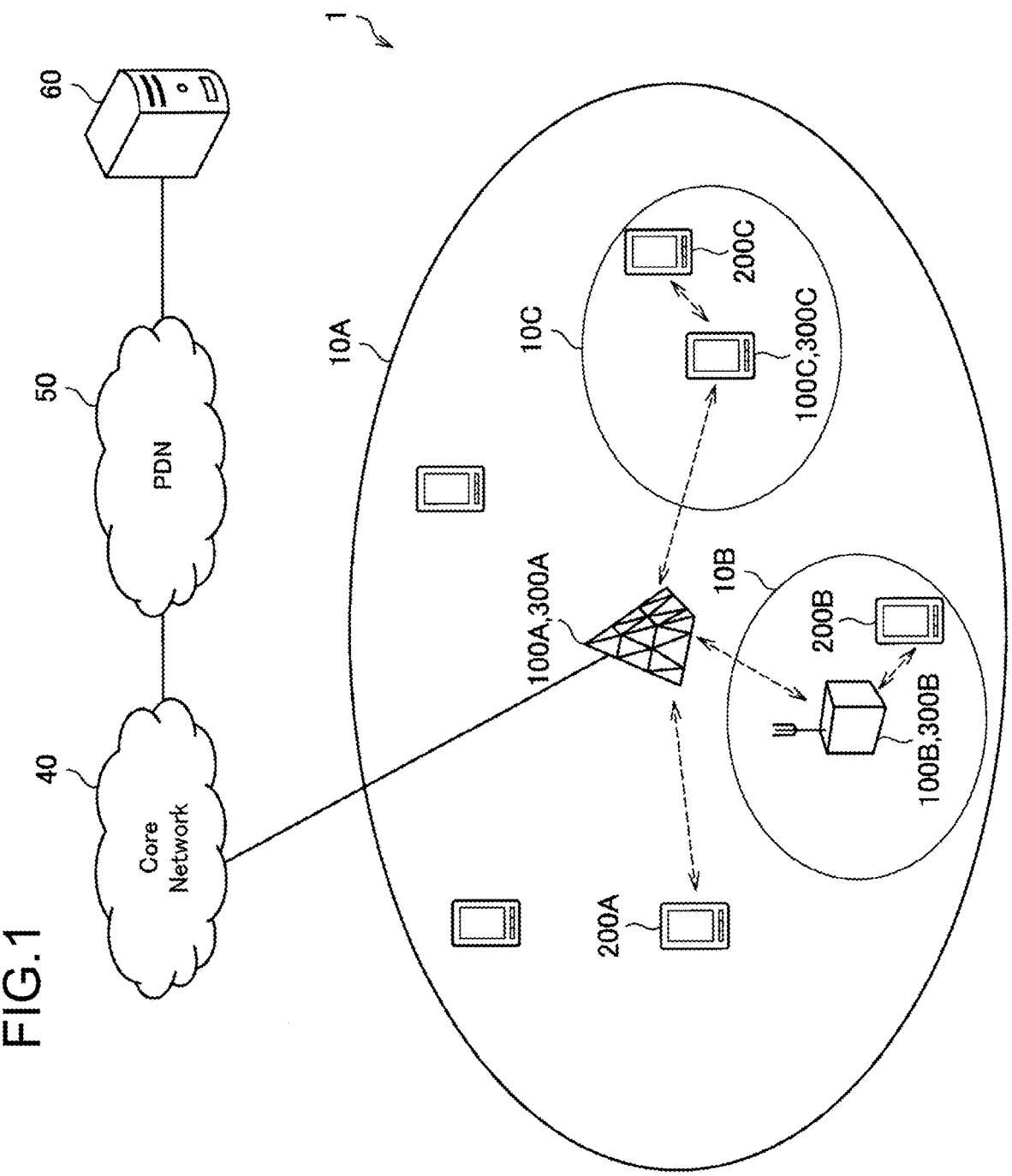
FIG. 1 is an explanatory diagram illustrating an example of a schematic configuration of a system according to an embodiment of the present disclosure.

Hereinafter, a preferred embodiment of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be provided in the following order.

1. Configuration example
1.1. Configuration example of system
1.2. Configuration example of base station
1.3. Configuration example of terminal apparatus
2. MBMS
3. Technical features
4. Application examples
4.1. Application examples for base station
4.2. Application examples for terminal apparatus
5. Concluding remarks

1. CONFIGURATION EXAMPLE 1.1. Configuration Example of System

An example of a schematic configuration of a system 1 according to an embodiment of the present disclosure is now described with reference to FIG. 1. FIG. 1 is an explanatory diagram illustrating an example of a schematic configuration of the system 1 according to an embodiment of the present disclosure. As illustrated in FIG. 1, the system 1 includes a wireless communication apparatus 100, a terminal apparatus 200, and an MEC server 300. The terminal apparatus 200 herein is also called a user. The user can also be called a UE. In other words, the above-described UE 200 can correspond to the terminal apparatus 200 illustrated in FIG. 1. The wireless communication apparatus 100C is also called UE-relay. The UE herein can be a UE defined in LTE or LTE-A, and the UE-relay can be the Prose-UE-to-Network relay, which is under development in 3GPP and can refer to more typically communication equipment.

(1) Wireless Communication Apparatus 100

The wireless communication apparatus 100 is an apparatus that provides a subordinate device with a wireless communication service. In one example, the wireless communication apparatus 100A is a base station of a cellular system (or a mobile communication system). The base station 100A establishes wireless communication with a device located within a cell 10A (e.g., the terminal apparatus 200A) of the base station 100A. In one example, the base station 100A transmits a downlink signal to the terminal apparatus 200A and receives an uplink signal from the terminal apparatus 200A.

The base station 100A establishes a logical connection with other base stations over, in one example, the X2 interface, and is capable of transmitting and receiving control information or the like. In addition, the base station 100A establishes a logical connection with a core network 40 over, in one example, the S1 interface, and is capable of transmitting and receiving control information or the like. Moreover, communication between these apparatuses can be relayed through various devices physically.

In this description, the wireless communication apparatus 100A illustrated in FIG. 1 is a macrocell base station, and the cell 10 is a macrocell. On the other hand, the wireless communication apparatuses 100B and 100C are master devices that operate the small cells 10B and 10C, respectively. As an example, the master device 100B is a fixedly installed small cell base station. The small cell base station 100B establishes a wireless backhaul link with the macrocell base station 100A and establishes an access link with one or more terminal apparatuses (e.g., the terminal apparatus 200B) within the small cell 10B. Moreover, the wireless communication apparatus 100B can be a relay node defined by 3GPP. The master device 100C is a dynamic access point (AP). The dynamic AP 100C is a mobile device that dynamically operates the small cell 10C. The dynamic AP 100C establishes a wireless backhaul link with the macrocell base station 100A and establishes an access link with one or more terminal apparatuses (e.g., the terminal apparatus 200C) within the small cell 10C. The dynamic AP 100C can be, in one example, a terminal apparatus equipped with hardware or software operable as a base station or a wireless access point. In this case, the small cell 10C is a dynamically configured localized network (virtual cell).

The cell 10 can be operated, in one example, in accordance with any wireless communication scheme such as LTE, LTE-Advanced (LTE-A), GSM (registered trademark), UMTS, W-CDMA, CDMA200, WiMAX, WiMAX2, IEEE802.16, and the like.

Moreover, the small cell is a concept that can include various types of cells (e.g., such as femtocells, nanocells, picocells, and microcells) that are smaller than the macrocell and are arranged to overlap or not to overlap with the macrocell. In one example, a small cell is operated by a dedicated base station. In another example, a small cell is operated by a terminal acting as a master device that temporarily operates as a small cell base station. It is also possible for a so-called relay node to be considered as a form of small cell base station. A wireless communication apparatus functioning as a master station of a relay node is also called a donor base station. The donor base station can mean a DeNB in LTE, and can more generally refer to a master station of a relay node.

(2) Terminal Apparatus 200

The terminal apparatus 200 is capable of performing communication in a cellular system (or a mobile communication system). The terminal apparatus 200 performs wireless communication with a wireless communication apparatus of the cellular system (e.g., the base station 100A and the master device 100B or 100C). In one example, the terminal apparatus 200A receives a downlink signal from the base station 100A and transmits an uplink signal to the base station 100A.

(3) Application Server 60

An application server 60 is a device that provides a user with a service. The application server 60 is connected to a packet data network (PDN) 50. On the other hand, the base station 100 is connected to the core network 40. The core network 40 is connected to the PDN 50 via a gateway device (P-GW in FIG. 8). Thus, the wireless communication apparatus 100 provides the MEC server 300 and the user with the service provided by the application server 60, via the packet data network 50, the core network 40, and the wireless communication channel.

(4) MEC Server 300

The MEC server 300 is a service-providing device that provides a user with a service (such as application and content). The MEC server 300 can be provided in the wireless communication apparatus 100. In this case, the wireless communication apparatus 100 provides the user with the service provided by the MEC server 300 via the wireless communication channel. The MEC server 300 can be implemented as a logical functional entity or can be configured integrally with the wireless communication apparatus 100 or the like as illustrated in FIG. 1.

In one example, the base station 100A provides the terminal apparatus 200A connected to the macrocell 10 with the service provided by the MEC server 300A. In addition, the base station 100A provides the terminal apparatus 200B connected to the small cell 10B, via the master device 100B, with the service provided by the MEC server 300A.

Further, the master device 100B provides the terminal apparatus 200B connected to the small cell 10B with the service provided by the MEC server 300B. Similarly, the master device 100C provides the terminal apparatus 200C connected to the small cell 10C with the service provided by the MEC server 300C.

(5) Supplement

Although the schematic configuration of the system 1 is described above, the present technology is not limited to the example illustrated in FIG. 1. Examples of the configuration of the system 1 can employ a configuration with no master device, a configuration of a small cell enhancement (SCE), a configuration of a heterogeneous network (HetNet), a configuration of a machine-type communication (MTC) network, or the like.

1.2. Configuration Example of Base Station

Figure 2:
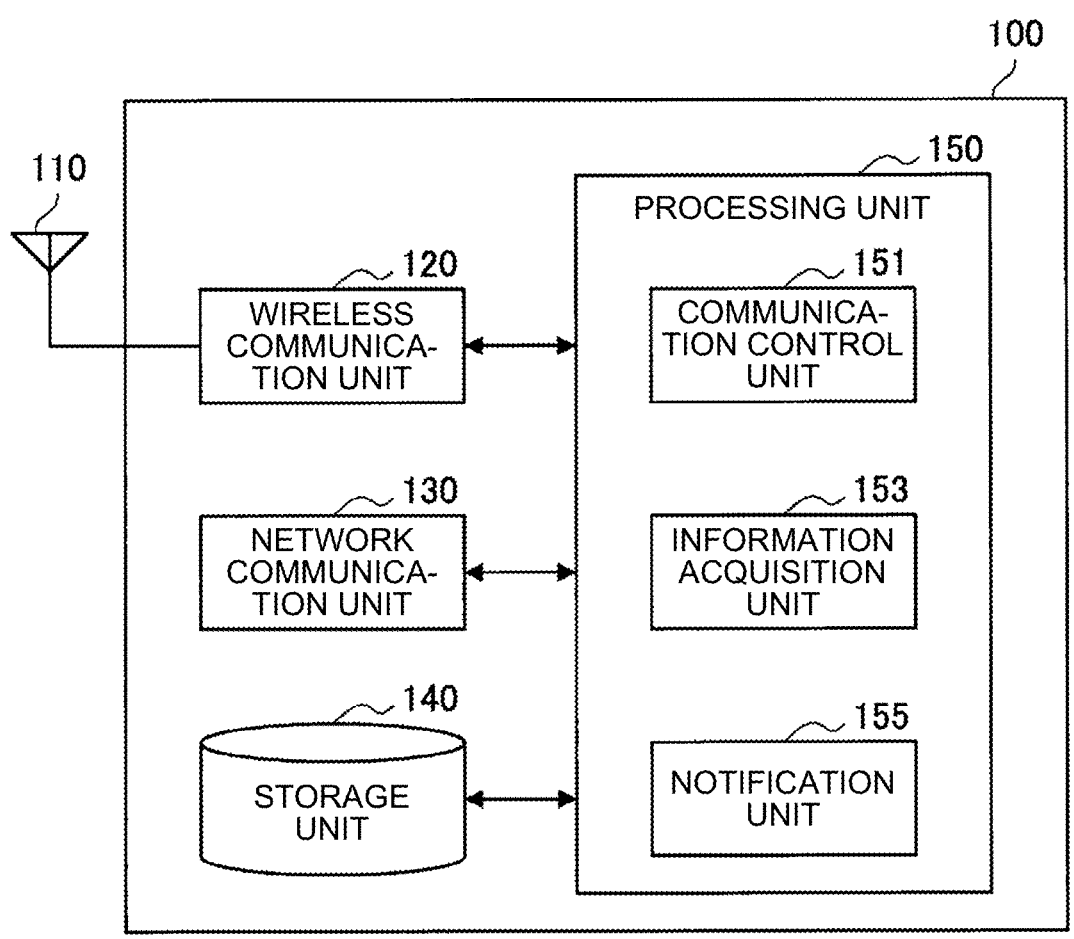
FIG. 2 is a block diagram illustrating an example of a configuration of a base station according to the present embodiment.

A configuration of the base station 100 according to an embodiment of the present disclosure is now described with reference to FIG. 2. FIG. 2 is a block diagram illustrating an example of a configuration of the base station 100 according to an embodiment of the present disclosure. Referring to FIG. 2, the base station 100 includes an antenna unit 110, a wireless communication unit 120, a network communication unit 130, a storage unit 140, and a processing unit 150.

(1) Antenna Unit 110

The antenna unit 110 radiates a signal output by the wireless communication unit 120 into space as a radio wave. In addition, the antenna unit 110 converts a radio wave in space into a signal and outputs the signal to the wireless communication unit 120.

(2) Wireless Communication Unit 120

The wireless communication unit 120 transmits and receives a signal. In one example, the wireless communication unit 120 transmits a downlink signal to a terminal apparatus and receives an uplink signal from a terminal apparatus.

(3) Network Communication Unit 130

The network communication unit 130 transmits and receives information. In one example, the network communication unit 130 transmits and receives information to and from other nodes. In one example, the above-mentioned other nodes include other base stations and core network nodes.

Moreover, as described above, in the system 1 according to the present embodiment, the terminal apparatus operates as a relay terminal to relay communication between a remote terminal and a base station in some cases. In such a case, in one example, the wireless communication apparatus 100C corresponding to the relay terminal is not necessarily provided with the network communication unit 130.

(4) Storage Unit 140

The storage unit 140 temporarily or permanently stores various data and a program necessary for operating the base station 100.

(5) Processing Unit 150

The processing unit 150 allows the base station 100 to perform various functions. The processing unit 150 includes a communication control unit 151, an information acquisition unit 153, and a notification unit 155. Moreover, the processing unit 150 can further include other components besides these components. In other words, the processing unit 150 can perform other operations than the operations of these components.

The operations of the communication control unit 151, the information acquisition unit 153, and the notification unit 155 will be described later in detail.

1.3. Configuration Example of Terminal Apparatus

Figure 3:
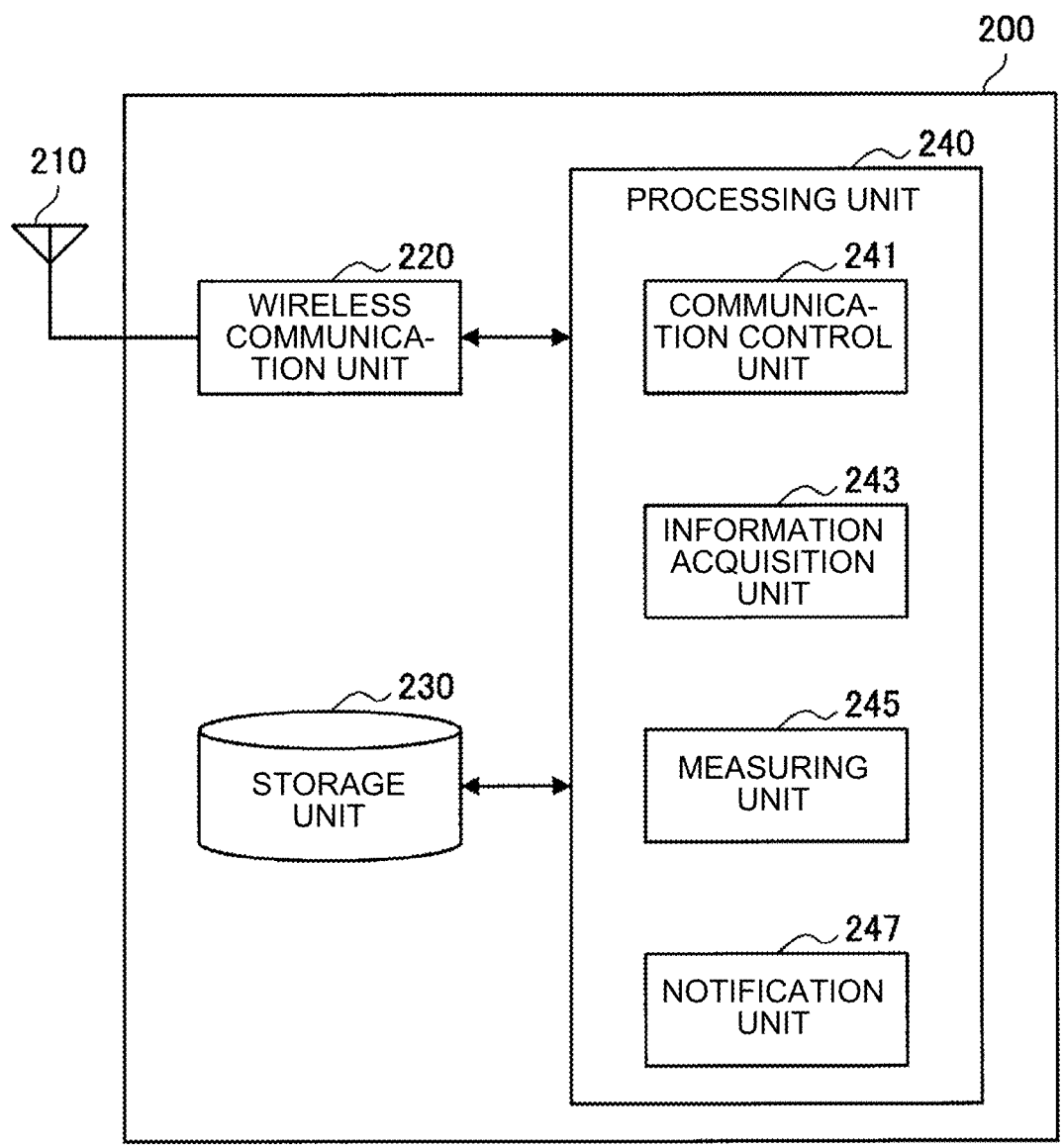
FIG. 3 is a block diagram illustrating an example of a configuration of a terminal apparatus according to the present embodiment.

An example of a configuration of the terminal apparatus 200 according to an embodiment of the present disclosure is now described with reference to FIG. 3. FIG. 3 is a block diagram illustrating an example of a configuration of the terminal apparatus 200 according to an embodiment of the present disclosure. As illustrated in FIG. 3, the terminal apparatus 200 includes an antenna unit 210, a wireless communication unit 220, a storage unit 230, and a processing unit 240.

(1) Antenna Unit 210

The antenna unit 210 radiates a signal output by the wireless communication unit 220 into space as a radio wave. In addition, the antenna unit 210 converts a radio wave in space into a signal and outputs the signal to the wireless communication unit 220.

(2) Wireless Communication Unit 220

The wireless communication unit 220 transmits and receives a signal. In one example, the wireless communication unit 220 receives a downlink signal from a base station and transmits an uplink signal to a base station.

Further, as described above, in the system 1 according to the present embodiment, the terminal apparatus can operate as a relay terminal to relay communication between a remote terminal and the base station in some cases. In such a case, in one example, the wireless communication unit 220 in the terminal apparatus 200C operating as a remote terminal can transmit and receive a side-link signal to and from the relay terminal.

(3) Storage Unit 230

The storage unit 230 temporarily or permanently stores various data and a program necessary for operating the terminal apparatus 200.

(4) Processing Unit 240

The processing unit 240 allows the terminal apparatus 200 to perform various functions. For example, the processing unit 240 includes a communication control unit 241, an information acquisition unit 243, a measuring unit 245, and a notification unit 247. Moreover, the processing unit 240 can further include other components besides these components. In other words, the processing unit 240 can perform other operations than the operations of these components.

The operations of the communication control unit 241, the information acquisition unit 243, the measuring unit 245, and the notification unit 247 will be described later in detail.

2. MBMS

A description of MBMS is now given. The MBMS is a technique for delivering content such as text, music, still images, and moving images to each terminal apparatus using a wireless network and is officially referred to as "multimedia broadcast multicast services". Moreover, a description of an overview of broadcast and multicast is given below to make the characteristics of the communication system according to an embodiment of the present disclosure easier to understand.

The broadcast is a unidirectional point-to-multipoint downlink transmission. The broadcast is unnecessary to communicate with a network in providing the service, even in a power-saving state not connected to the network, such as a so-called "RRC idle" state, the terminal apparatus is capable of receiving the delivery of a broadcast service. In other words, the terminal apparatus is capable of, even in the RRC idle state, receiving content that is broadcast from the base station and presenting the content to the user.

The multicast is similar to the broadcast in that it provides a plurality of terminal apparatuses with a service. However, the multicast differs from the broadcast in that the terminal apparatus, upon receiving a service, is necessary to indicate to the network that the terminal apparatus intends to receive the service. In other words, in the multicast, the terminal apparatus necessitates communication with the network to receive a service.

Moreover, in 5G, a high frequency of 6 GHz or more is usable, but a high-frequency band has higher propagation loss. Thus, to compensate for propagation loss, a higher antenna gain is obtained by giving directivity to radio waves (wireless signals) by beamforming. For this reason, the directivity is directed to a particular terminal apparatus by beamforming, so it is desirable to indicate that the terminal apparatus intends to receive the service corresponding to MBMS. In other words, in applying MBMS to the 5G mobile communication system, it is more important to implement the delivery of content by multicast. Moreover, in the following description, the service corresponding to MBMS is also referred to as "MBMS service".

Figure 4:
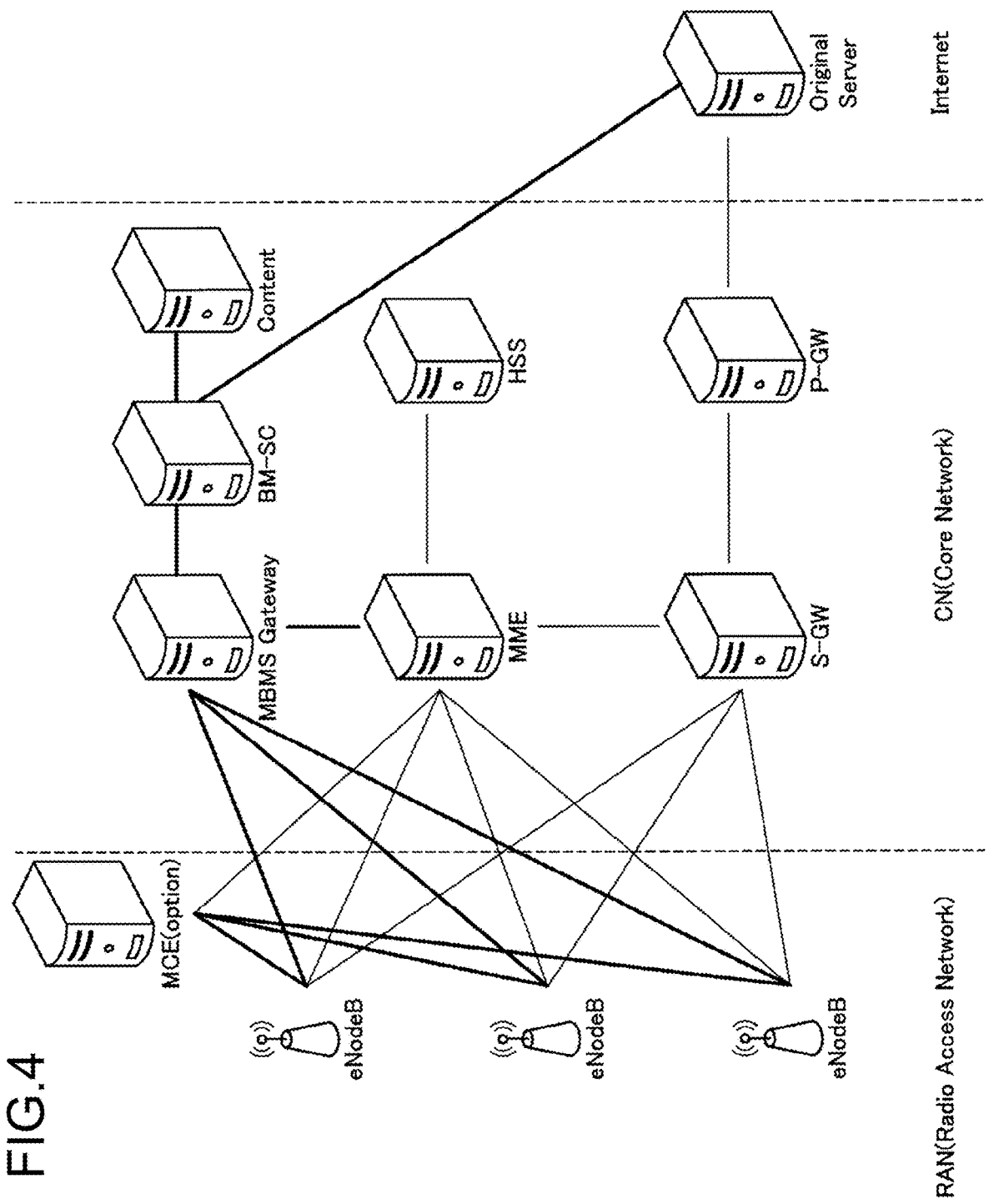
FIG. 4 is an explanatory diagram illustrating an overview of MBMS network architecture.

(MBMS Network Architecture) An overview of the MBMS network architecture is now described with reference to FIG. 4. FIG. 4 is an explanatory diagram illustrating an overview of the MBMS network architecture.

As illustrated in FIG. 4, the MBMS network architecture includes a core network (CN) and a radio access network (RAN). In addition, the CN includes various entities. Examples of the entities included in the CN include mobility management entity (MME), home subscriber server (HSS), serving gateway (S-GW), packet data network gateway (P-GW), MBMS gateway, broadcast multicast service center (BM-SC), content server, and the like. In addition, in the MBMS network architecture, an example of an entity on the side of the RAN includes multi-cell/multicast coordination entity (MCE). Moreover, among these entities, MCE, MBMS gateway, BM-SC, and content server are entities specific to MBMS, and the other entities are similar to the entities used for unicast communication in LTE. In addition, the content to be provided in the MBMS service can be provided from inside the operator's network or can be provided from the Internet network.

An overview of each of the entities specific to the MBMS, that is, the MCE, the MBMS gateway, the BM-SC, and the content server is now described.

(MCE)

A description of MCE is first given. As illustrated in FIG. 4, the MCE is classified as an entity on the side of the RAN. The MCE can be located in each base station (eNodeB) or can be located outside the base station. Examples of the role of the MCE include three functions of "allocation of time and frequency resources for MBMS", "decision of modulation and coding scheme (MCS)", and "counting function". Moreover, the MCS corresponds to a modulation scheme or coding rate. In addition, the counting function corresponds to a function of collecting how much the user is interested in the service. The counting function makes it possible, in one example, for the base station to allocate time and frequency resources for MBMS or stop the allocation depending on the number of interested users (i.e., the number of terminal apparatuses desiring to deliver content).

Moreover, in LTE, an omnidirectional beam is used, so it is difficult to control the MCS individually for each terminal apparatus. On the other hand, in 5G, it is possible to allocate a beam individually to each terminal apparatus, so in one example, it is also possible to provide content (e.g., content corresponding to MBMS) using different MCSs for each terminal apparatus.

In other words, in 5G, in one example, a situation can be assumed in which an MBMS service is provided to each terminal apparatus using a UE-specific beam. Even in a case where the handling between the base station and the terminal apparatus is used like unicast (strictly speaking, it is multicast because similar content is delivered to a plurality of terminal apparatuses), the content is delivered using multicast (multicast for the IP layer) between the content server and the base station. Thus, a function called counting is important to specify which base station to perform multicasting.

Figure 5:
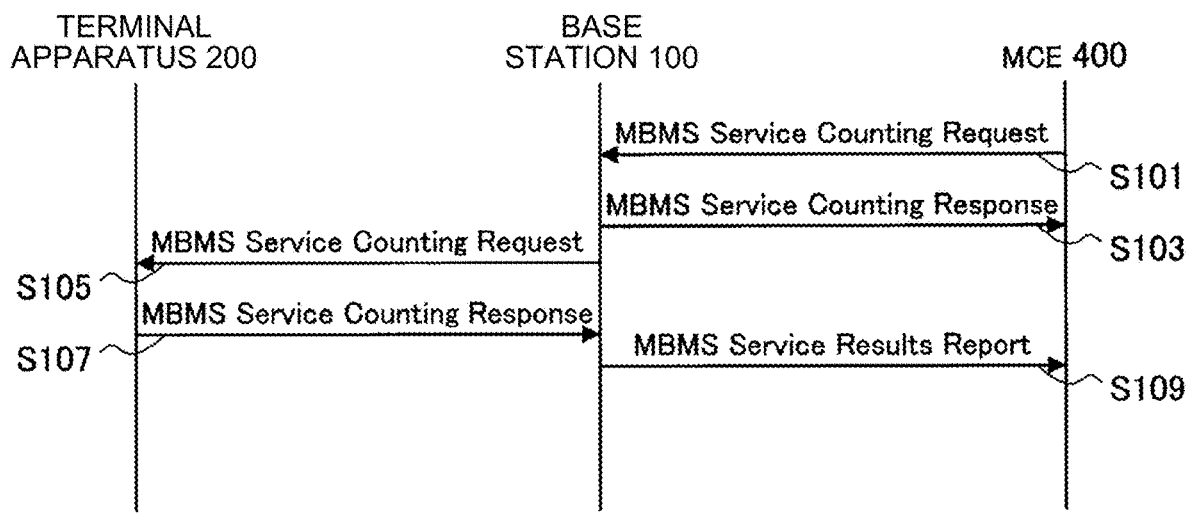
FIG. 5 is an explanatory diagram illustrating an example of a procedure for performing "counting".

For reference, an example of the existing procedure for performing the counting is now described with reference to FIG. 5. FIG. 5 is an explanatory diagram illustrating an example of a procedure for performing counting.

As illustrated in FIG. 5, at first, an MCE 400 transmits an MBMS service counting request to the base station 100 (S101). The base station 100 receives the MBMS service counting request from the MCE 400 and replies an MBMS service counting response to the MCE 400 (S103). Then, the base station 100 transmits an MBMS service counting request to the terminal apparatus 200 (S105). The terminal apparatus 200 receives the MBMS service counting request from the base station 100 and replies an MBMS service counting response to the base station 100 (S107). Then, the base station 100, when receiving the MBMS service counting response from the terminal apparatus 200, transmits an MBMS service results report to the MCE 400 (S109). The procedure as described above makes it possible for the MCE 400 to recognize the number of terminal apparatuses that desire to provide the MBMS service, in one example, on the basis of the report (the MBMS service results report) transmitted from the base station 100.

(MBMS Gateway)

Subsequently, a description of the MBMS gateway is given. As illustrated in FIG. 4, the MBMS gateway is an entity located in the CN. The MBMS gateway has a function of sending a packet to a corresponding base station (eNodeB) using Internet protocol (IP) multicast address as a key. In LTE, MBMS is assumed only to use broadcast and does not support multicast. This means that the service does not support multicast. On the other hand, multicast is used for the IP layer. Specifically, in order for the service to be broadcast to a plurality of terminal apparatuses, the previous signaling between the plurality of base stations and the MBMS gateway allows at least some of the base stations to be specified and to be transferred only to the specified base station. Thus, a multicast address is used in the IP layer.

Figure 6:
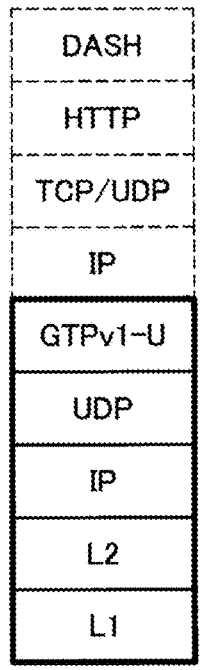
FIG. 6 is a diagram illustrating an example of a protocol stack of an M1 interface between an MBMS gateway and a base station.

In one example, FIG. 6 is a diagram illustrating an example of a protocol stack of the M1 interface between the MBMS gateway and the base station. Among the protocols illustrated in FIG. 6, the layers of DASH, HTTP, TPC/UDP, and IP located on the upper side are not explicitly described in the standard, but it is presumed that the configuration illustrated in FIG. 6 will be obtained in a case similar to the ordinary unicast. In addition, the layers of GTPv1-U, UDP, IP, L2, and L1 located on the lower side are similar to the S1 interface in the unicast. Moreover, the IP layer used to transfer a packet to a plurality of base stations on the basis of the multicast address is an IP layer located on the lower side.

In LTE, as described above, a packet is multicast from the MBMS gateway to a plurality of base stations, and the plurality of base stations transmit packets received in synchronization with each other to a terminal apparatus through wireless communication. On the other hand, in 5G, an MBMS service is provided to each terminal apparatus using a UE-specific beam. Thus, a cache function is provided for the base station, and the terminal apparatus is capable of optionally selecting the time for receiving the MBMS service within a certain fixed period.

In 5G MBMS, caching of the content corresponding to MBMS (hereinafter also referred to as "MBMS content") in a base station makes it possible to provide a terminal apparatus with a service more flexibly, resulting in expecting an effect of further reducing the CN traffic. In addition, it is possible to reduce resource consumption by MBMS on the side of RAN, by transmitting content for each terminal apparatus using the UE-specific beam instead of transmitting content by the existing broadcast or multicast on the side of RAN.

(BM-SC)

Subsequently, a description of BM-SC is given. The BM-SC corresponds to the entry point of MBMS content. The BM-SC has the functions as described below. As the first function, the BM-SC performs MBMS session management. Specifically, the BM-SC manages the start and end of the MBMS service. As the second function, the BM-SC allocates an ID called a temporary mobile group identity (TMGI) to each MBMS session. As the third function, the BM-SC allocates QoS to an MBMS session. As the fourth function, the BM-SC provides the terminal apparatus with information regarding broadcasting such as a program guide at the application level (T529.061).

In LTE, the MBMS traffic and the unicast traffic are separated into subframes. Specifically, a radio frame having a length of 1 ms is divided into ten subframes having a length of 0.1 ms, and an MBMS service is provided in some of the subframes. Thus, MBMS and unicast are separate networks, and even if the unicast traffic increases, the situation where the MBMS traffic is affected is extremely limited, in one example, as in the case or the like where the subframes allocated to MBMS are semi-statically changed. In a case where the MBMS service is provided by unicast using a UE-specific beam, it can be assumed that there is a possibility that at least one of the ordinary unicast or the unicast of the MBMS service affects the other.

(Content Server)

Subsequently, a description of the content server is given. The content server is a server that provides content. The content server can be located both inside and outside the operator's network.

(Session Start Procedure)

Subsequently, an example of an MBMS session start procedure in LTE is described for reference to make the characteristics of the communication system according to the present embodiment more understandable. In one example, FIG. 7 is a sequence diagram illustrating an example of the MBMS session start procedure in LTE.

Figure 7:
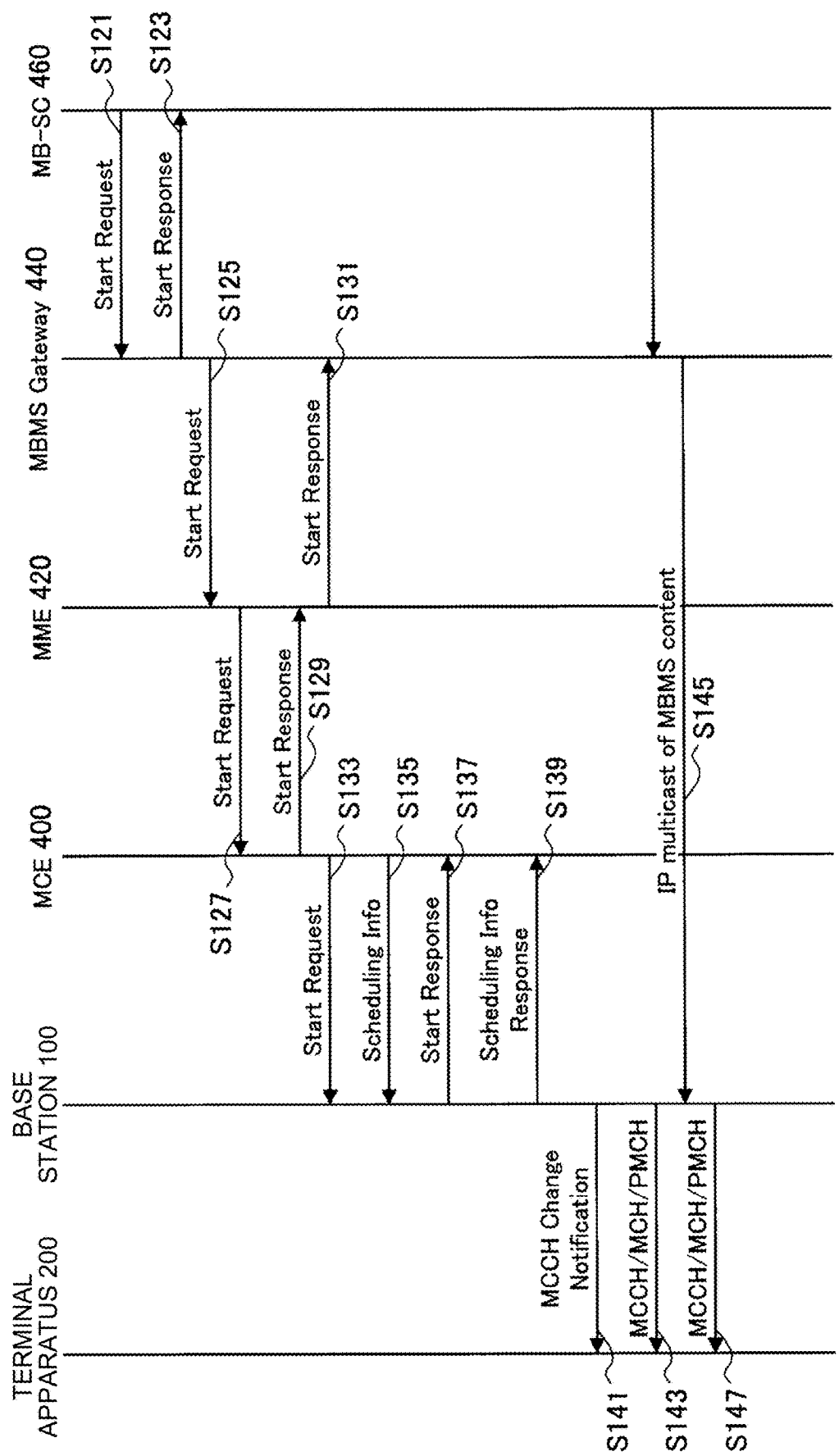
FIG. 7 is a sequence diagram illustrating an example of an MBMS session start procedure in LTE.

As illustrated in FIG. 7, the MBMS session start procedure starts from an MB-SC. Specifically, at first, an MB-SC 460 transmits a request to start (Start Request) an MBMS session to an MBMS gateway 440 (S121). In this case, in one example, information such as a service area, QoS, and a mobile group identity (MGI) is notified through the request. The MBMS gateway 440 replies a response to the request (Start Response) from the MB-SC 460 (S123).

Subsequently, the MBMS gateway 440 transmits a request to start (Start Request) the MBMS session to the MME 420 (S125). The MME 420, when receiving the request from the MBMS gateway 440, transmits a request to start (Start Request) an MBMS session to the MCE 400 (S127). The MCE 400, when receiving the request from the MME 420, replies a response (Start Response) to the MME 420 (S129). The MME 420, when receiving the response from the MCE 400, replies, to the MBMS gateway 440, a response (Start Response) to the request from the MBMS gateway 440 (S131).

Subsequently, the MCE 400 transmits a request to start (Start Request) the MBMS session to the base station 100 that is the service area (S133). In addition, the MCE 400 notifies the base station 100 of information regarding the schedule of the MBMS session (Scheduling Info) (S135). The base station 100 replies, to the MCE 400, a response (Start Response) to the request from the MCE 400 (S137). In addition, the base station 100, when receiving the notification of the information regarding the schedule of the MBMS session from the MCE 400, replies a response (Scheduling Info Response) to the MCE 400 (S139).

Subsequently, the base station 100, on the basis of the information notified from the MCE 400, transmits an MCCH change notification to the terminal apparatus 200 within the communication range (S141) and then transmits MCCH/MCH/PMCH to the terminal apparatus 200 (S143). Moreover, the details of MCCH, MCH, and PMCH will be separately described later.

Subsequently, the target MBMS content is transferred from the MB-SC 460 to the MBMS gateway 440, and the MBMS content is IP multicast from the MBMS gateway 440 to the base station 100 (S145). The base station 100, when receiving the MBMS content from the MBMS gateway 440, transmits MCCH/MCH/PMCH to the terminal apparatus 200. In other words, the base station 100 broadcasts the received MBMS content (S147).

The example of the MBMS session start procedure in LTE is described above with reference to FIG. 7. On the other hand, there is a possibility that, in 5G NR, a procedure for starting a session from the terminal apparatus is added to the existing session start procedure. This is because it is possible to change the content delivery time for each terminal apparatus in the MBMS service provided using the UE-specific beam.

(Radio Access Network of MBMS)

Subsequently, the characteristics of the MBMS in the RAN is now described.

(1) Logical Channel for MBMS

The multimedia broadcast multicast service (MBMS) is provided over two logical channels of multicast transport channel (MTCH) and multicast control channel (MCCH). These two channels are mapped to PMCH (PHY Multicast Channel) as physical channels. In the PMCH, both the MCCH and the MTCH are sent, and scheduling information for mapping between the MBMS session and the PMCH generated as MAC signaling is also sent. This Mac signaling is sent in the header of the PMCH.

(2) Physical Channel for MBMS

Figure 8:
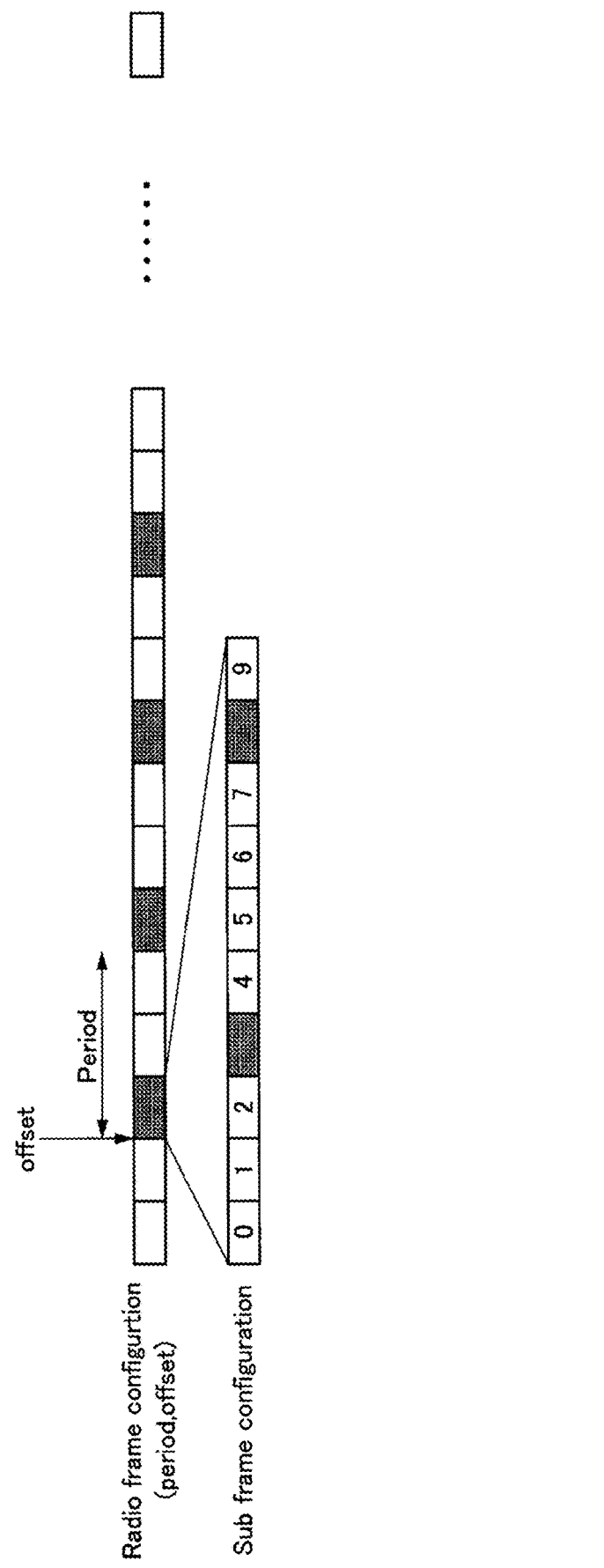
FIG. 8 shows an example of a frame structure upon using MBMS.

The PMCH uses a cyclic prefix having a relatively long CP length called extend CP. This is to constitute a single-frequency network for combining signals from a plurality of base stations. In LTE, one radio frame has 10 subframes of which subframes in which MBMS single-frequency network (MBSFN) is usable are designated semi-statically to be used. In one example, FIG. 8 illustrates an example of a frame structure in a case of using the MBMS. In FIG. 8, the marked subframes schematically show subframes in which the MBSFN is usable. In addition, the marked frames schematically show a frame including a subframe in which the MBSFN is usable.

Some of the subframes for MBSFN are used for PDCCH and PDSCH, but the PDCCH is used not for MBMS but for transmission of uplink scheduling information necessary for ordinary unicast traffic. Thus, the PDSCH portion in the subframes for MBSFN is used for MBMS, and the PMCH is transmitted by the PDSCH.

(3) MBMS Session

In the present disclosure, one program is also referred to as an MBMS session. In this case, the MBMS session is mapped to the PMCH (PHY Multicast Channel) that is the physical channel. In addition, the PMCH is mapped to a subframe allocated for the MBMS.

(4) MBMS Service Area

The MBMS service area corresponds to an area where one MBMS service is provided. In addition, the MBSFN area corresponds to an area that constitutes a single-frequency network (SFN). In the MBSFN area, it is possible to set up to eight areas for one base station. In a case where the SFN is configured, a plurality of base stations cooperates and transmits the same content.

Moreover, in 5G, it can be assumed that the MBMS session is provided to each terminal apparatus using the UE-specific beam. In the existing MBMS, the SFN technology described later is used, so it is not necessary to consider handover. On the other hand, in 5G, a mechanism corresponding to the MBMS handover is necessary due to the above-described characteristics. Thus, in one example, it can be necessary to notify the number of the MBMS session from the switching source base station to the switching destination base station. In this description, in a case where a beam necessary for beam recovery is provided from another base station (e.g., a base station in an adjacent cell), it is also possible to reduce the latency by including the MBMS session in a beam recovery request.

(5) SFN

The single-frequency network (SFN) is the technology in which the same signal is transmitted simultaneously at the same time and frequency from a plurality of base stations (eNodeBs) and the plurality of downlink signals is regarded as a reflected wave within the range of the cyclic prefix (CP), combined, and received, resulting in improving the signal strength. In the case of broadcasting, a wide reception range of the terminal apparatus is necessary, so the SFN can be used in some cases.

(6) MBMS Scheduling

In some cases, it is difficult for a terminal apparatus to receive a program without knowing where the base station (eNodeB) transmits the program. In such a case, the terminal apparatus is necessary to acquire scheduling information (i.e., information indicating where transmission is being performed).

Figure 9:
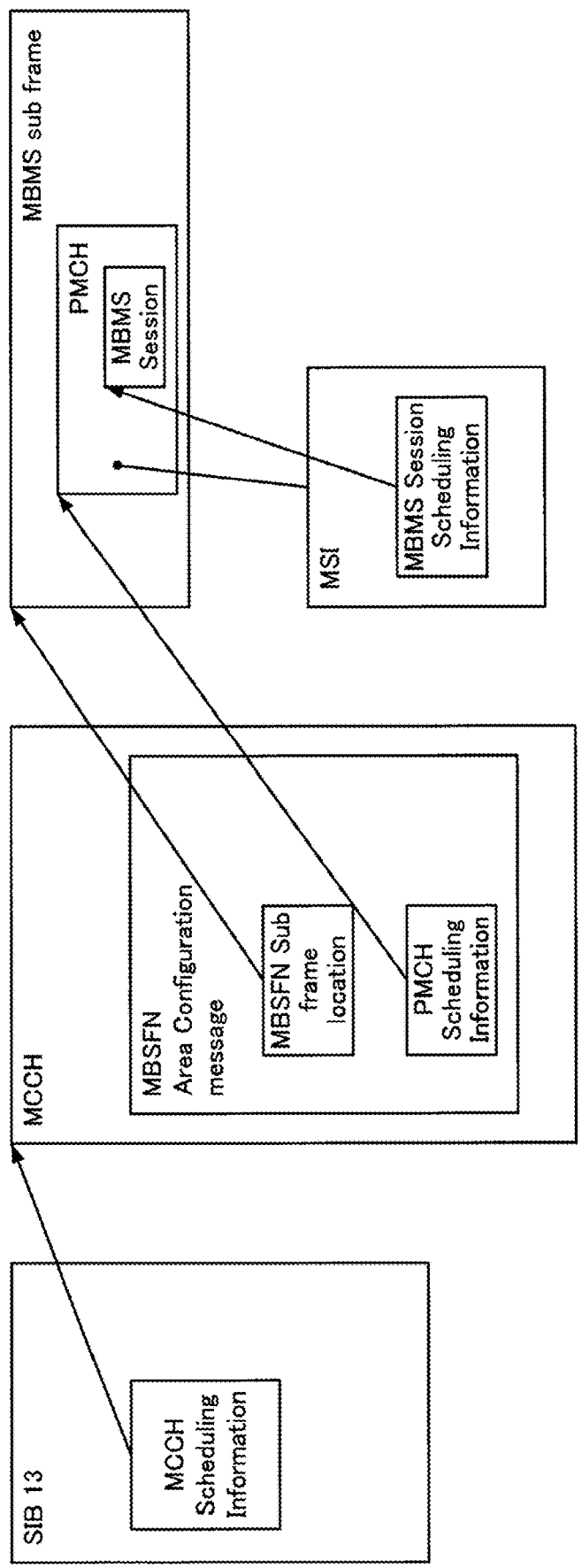
FIG. 9 is an explanatory diagram illustrating an overview of information associated with an MBMS session.

The scheduling is performed in accordance with the procedure described below. The details of each procedure are described below with reference to FIG. 9. FIG. 9 is an explanatory diagram illustrating an overview of information associated with an MBMS session.

Specifying radio frame and subframe

MBSFN area configuration

Specifying MBMS session (Specifying Radio Frame and Subframe)

The location of the MCCH is specified in the SIB 13 of the system information. Specifically, the location of a radio frame including the MCCH is specified by a period and an offset. Furthermore, it is specified which subframe in each radio frame includes the MCCH. The location of the MCCH is actually the PMCH, so the MCCH is transmitted in the PDSCH portion of the MBSFN subframe.

(MBSFN Area Configuration)

The MCCH includes the MBSFN area configuration. The MBSFN area configuration specifies which subframe where the MBSFN is performed. The specifying of the subframe is settable by a period and an offset of a radio frame. In this case, it is possible to set simultaneously eight types of different periods and offsets for the specifying of the subframe. In addition, which subframe in the radio frame is used is also set. Such an operation allows a subframe usable for MBMS to be determined. In the subframes for MBMS determined as described above, how to allocate the PMCH is also specified. The PMCH can set up to 16 channels.

(Specifying of MBMS Session)

It is possible to set up to 30 MBMS sessions (i.e., programs) for 16 PMCHs determined as described above. As a specific example, MBMS sessions 0 and 1 can be set for PMCH0, and MBMS sessions 2, 3, 4, 5, and 6 can be set for PMCH1.

How to map the MBMS session to the PMCH is specified using the Mac signaling sent by the PMCH. The Mac signaling is a kind of RRC signaling in the SIB 13, so it is said that the MBMS scheduling is performed by a combination of RRC signaling and Mac signaling.

In 5G, it is conceivable that the MBMS session can be provided to each terminal using the UE-specific beam. In this case, the SFN is not necessary to be used, and there is a possibility that the terminal apparatus is able to receive the delivery of television broadcast at the desired time. The content that is broadcast in the MBMS session is transmitted from the BM-SC to each base station (eNodeB) via the MBMS gateway. This content can be provided as a broadcast to the terminal apparatus at a time desired by the terminal apparatus as long as the content is held as a cache in the base station. In a case where the cache capacity has a physical limit, the expiration date can be given to the information of the MBMS session disclosed in the SIB. The location where the existing MBMS session is provided is disclosed on the PMCH specified by the information of the radio frame and subframe and the location of the PMCH in the subframe. On the other hand, in the case where the MBMS service is provided using the beam, it is also possible to disclose the information of the MBMS session as follows.

Disclosure is performed as before by system information embedded in performing beamforming during beam management. Moreover, beam management is a procedure for identifying an appropriate beam between a base station and a terminal apparatus.

In a procedure after determining an appropriate beam between a base station and a terminal apparatus, the provision of MBMS information is notified on the downlink control channel (DCI).

(7) Entity for Receiving MBMS

The above-mentioned MBMS service can be provided to both the terminal apparatus in the RRC idle mode and the terminal apparatus in the RRC connected mode. Thus, it is also possible for a terminal in the RRC idle mode to receive the various information described above.

(8) MCS (Modulation Scheme) Used in MBMS

As described above in connection with the network architecture, in the existing MBMS in LTE, the MCS can be changed by the MCE, but it is the broadcasting, so the frequency to be changed is small. Thus, in the existing MBMS in LTE, in one example, a common MCS that is preset for all terminal apparatuses is used.

On the other hand, in 5G, it is conceivable that the MBMS session is provided to each terminal apparatus using a UE-specific beam. In such a case, it is possible to provide the MBMS service by changing the MCS between the base station and the terminal apparatus. Furthermore, in a case where the beam is blocked by an obstacle such as a person or a car located between the base station and the terminal apparatus, it is necessary, in some cases, to switch the beam used for communication into that from another base station. In such a case, there is a possibility that an MCS different from the MCS used in the beam before the switching is used for the beam after the switching, and it can be assumed that the MCS before and after the switching is discontinuous.

(9) Feedback Information from Terminal Apparatus

The feedback information from a terminal apparatus is not specified in the MBMS in LTE at present. There is the mixed mode in which both ordinary LTE and MBMS are operated, but even in this case, feedback regarding the MBMS is not specified as a standard.

3. TECHNICAL FEATURES

Technical features of the communication system according to an embodiment of the present disclosure are now described. As described above, in 5G MBMS, an MBMS service is assumed to be provided for each terminal apparatus. The present disclosure thus focuses on a technique for enabling an MBMS service to be provided to each terminal apparatus using a cell-specific beam. More specifically, there is provided a technique capable of controlling the MBMS service provision in a cell-specific manner by providing a cell-specific beam in consideration of the position of a terminal apparatus or the like.

(Basic Configuration)

A basic configuration of the communication system according to an embodiment of the present disclosure is first described. In a 5G network, it is possible to provide the service using a millimeter waveband from 6 GHz to 100 GHz. The radio waves from 6 GHz to 100 GHz have a larger propagation loss than radio waves in a frequency band used in a network based on standards such as LTE, so it is difficult to make the radio waves reach far. For this reason, the transmission loss is compensated in some cases by using the beamforming technique having a high antenna gain so that the transmission energy is concentrated in a particular direction. From such a background, in 5G, an approach to transmit a control signal and a data signal using a beam having directivity by the beamforming is studied. Moreover, in the following description, a beam having directivity by the beamforming is also referred to as a "directional beam" or simply "beam".

On the other hand, the MBMS corresponds to so-called broadcasting, and it is necessary to deliver data to be broadcasting (hereinafter, also referred to as "broadcasting data") to terminal apparatuses of an unspecified number of users. In the existing LTE, broadcasting data is provided to each terminal apparatus using an omnidirectional antenna. In 5G, broadcasting data is provided by the beamforming technique using a directional antenna as described above. Here, under the situation where broadcasting data is provided using a UE-specific beam for each terminal apparatus, in a case where a very large number of terminal apparatuses exist within the communication range of the base station, it is necessary to allocate a beam to each of the terminal apparatuses in some cases. In such a case, a situation where the frequency and time resources of a network are consumed more can be assumed.

In view of the above situation, the present disclosure provides an example of a technique for providing broadcasting data (i.e., MBMS content) using a beam common to each base station, that is, a cell-specific beam. Information regarding a program to be broadcast (e.g., information regarding a beam corresponding to particular broadcasting) is provided in an area of system information included in a beam of beam sweeping for synchronization. More specifically, in one example, for each program (i.e., MBMS session), the provision of information indicating which beam of which subframe is provided is performed.

In the related art (e.g., LTE), as described with reference to FIG. 9, after providing information regarding a subframe or the like, information indicating which program is included in the subframe is provided. On the other hand, in 5G, after providing the information regarding the program, then it is desirable to be notified of what beam is used (i.e., what kind of beam sweeping is used) to provide information for each program. With such a configuration, in one example, even in a case where a terminal apparatus desiring the delivery differs for each program, it is possible to optimize settings of beam sweeping (e.g., a period of beam sweeping, the number of beams provided by beam sweeping, and beam direction provided by beam sweeping) for each program.

Figure 10:
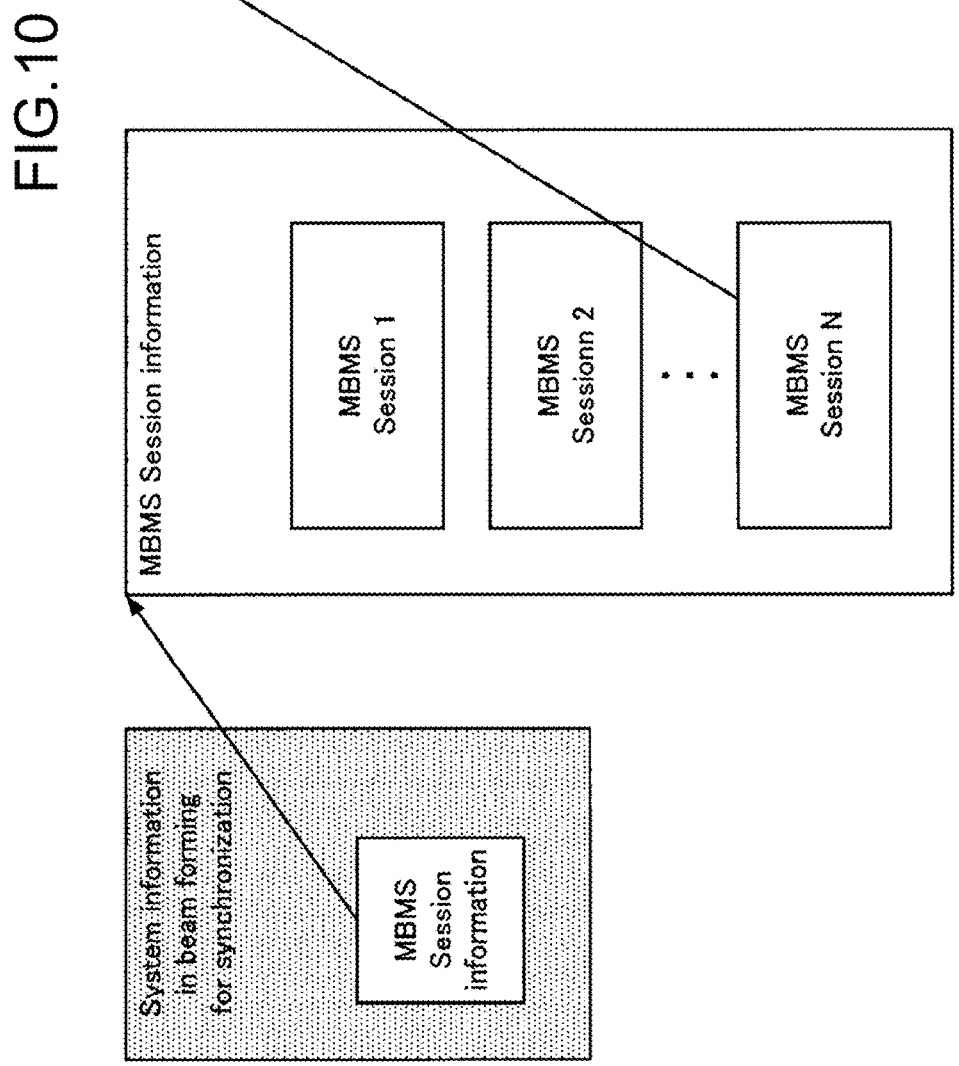
FIG. 10 is an explanatory diagram illustrating an overview of information associated with an MBMS session.

The implementation of the above-described operation is desirable, in one example, to associate a resource configuration of beam sweeping with an MBMS session. The MBMS session is associated with one or more beam sweeping configurations capable of delivering the MBMS session. In one example, FIG. 10 is an explanatory diagram illustrating an overview of information associated with an MBMS session. As illustrated in FIG. 10, the information regarding an MBMS session is first provided to a terminal apparatus as system information included in a beam for transmitting a synchronization signal or the like (i.e., a beam transmitted in the beam sweeping for synchronization). In other words, the information regarding the MBMS session is provided in association with the system information. Examples of the information regarding the MBMS session include an MBMS session ID for identifying a corresponding program, the beam sweeping configuration, and the like, as illustrated in FIG. 10. Moreover, the information regarding the MBMS session corresponds to an example of "first information". In addition, information (e.g., system information) provided commonly to a plurality of terminal apparatuses and associated with the information to provide information regarding the MBMS session to the terminal apparatus corresponds to an example of "second information".

Figure 11:
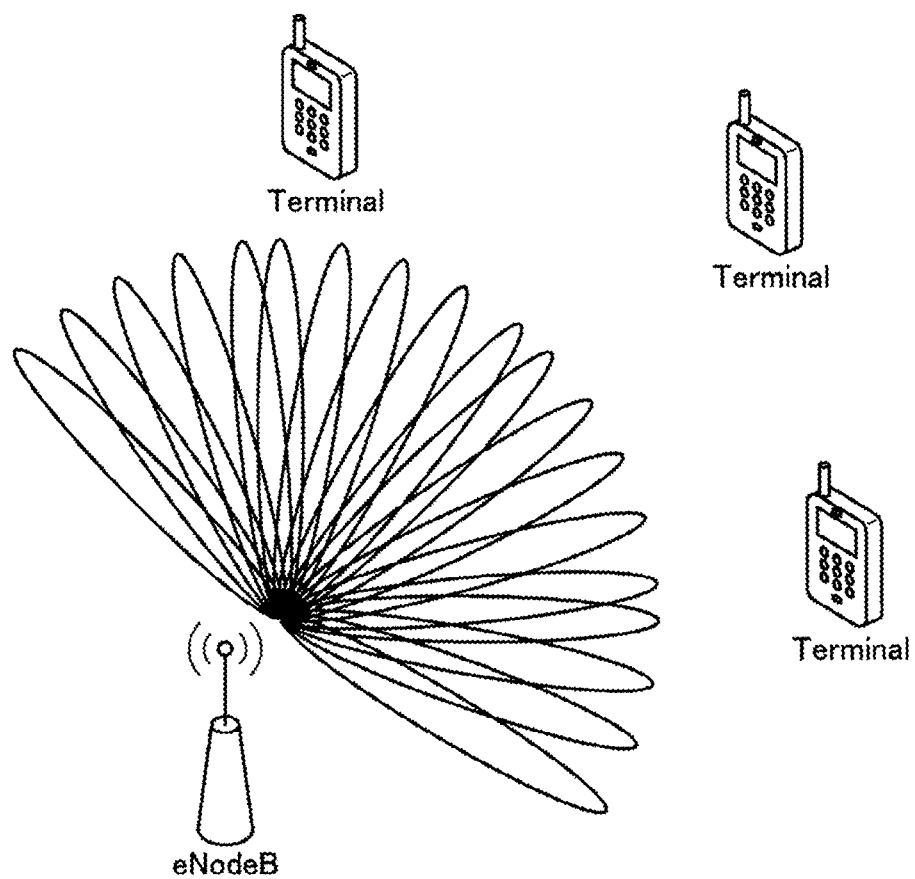
FIG. 11 is an explanatory diagram illustrating an overview of a beam sweeping configuration.
Figure 12:
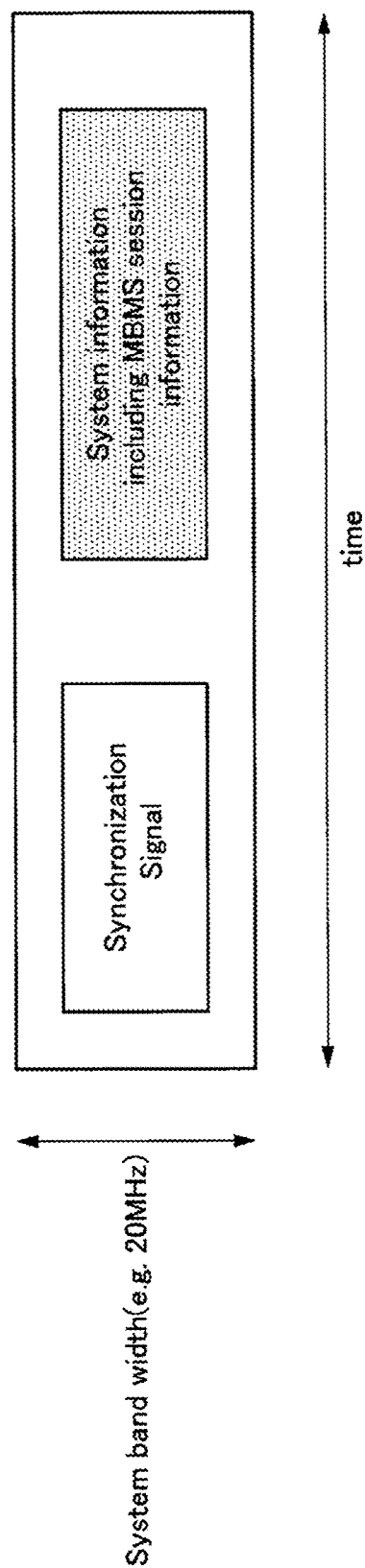
FIG. 12 is an explanatory diagram illustrating an overview of the beam sweeping configuration.

An overview of the beam sweeping configuration is now described with reference to FIGS. 11 and 12. FIG. 11 and FIG. 12 are explanatory diagrams illustrating the overview of the beam sweeping configuration. As illustrated in FIG. 11, the base station performs beam sweeping using a plurality of beams every predetermined period (e.g., 10 ms or 20 ms) as if it were a lighthouse light. Each beam transmitted by the beam sweeping includes, in one example, synchronization signal that is a signal for synchronization, system information, and the like, as illustrated in FIG. 12. Each of a plurality of beams transmitted from one base station by one time of beam sweeping (i.e., a plurality of beams belonging to the beam sweeping) includes system information indicating common contents. This is because it is not necessary to change the contents of system information for each beam due to the characteristics of providing information to an unspecified number of terminal apparatuses. Thus, information common to each beam is provided as information regarding the MBMS session provided in association with the system information (MBMS session information). Moreover, although the example in which a beam including synchronization information is used is given in the above description, as long as a beam is intended to provide system information, the beam may necessarily not include a synchronization signal.

In the examples illustrated in FIGS. 11 and 12, the information regarding the beam sweeping configuration is provided for each MBMS session. The beam sweeping for each program indicated by the information is thus performed separately from the beam sweeping for providing the information. In one example, in the case of the examples illustrated in FIGS. 11 and 12, the beam sweeping is performed for each program by the number of MBMS sessions.

Figure 13:
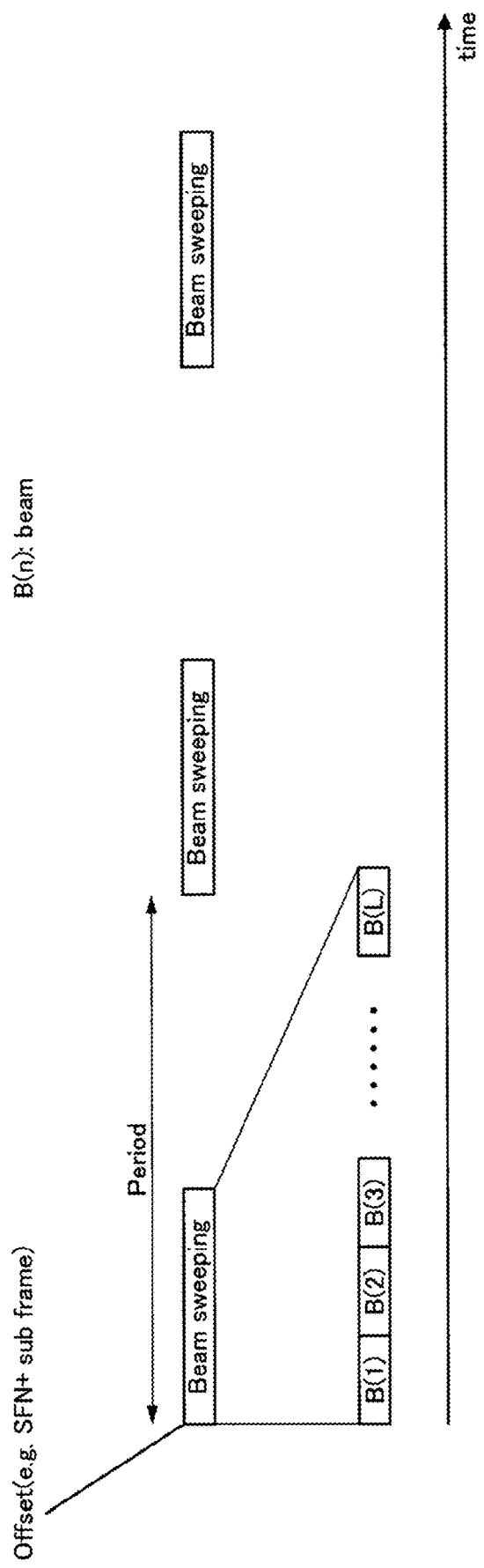
FIG. 13 is an explanatory diagram illustrating an overview of beam sweeping configuration for each MBMS session.

An overview of the beam sweeping configuration for each MBMS session is now described with reference to FIG. 13. FIG. 13 is an explanatory diagram illustrating an overview of the beam sweeping configuration for each MBMS session. As illustrated in FIG. 13, the beam sweeping configuration for each MBMS session includes, in one example, settings indicating when and on what resources the beam sweeping is performed. In other words, the beam sweeping configuration includes, in one example, information regarding a timing at which a beam is transmitted (irradiated) in each of a plurality of directions, information regarding a frequency band usable in communication using the beam, and the like.

The beam sweeping configuration for each MBMS session includes, as illustrated in FIG. 13, the settings indicating when and on what resource the beam sweeping is performed. The example illustrated in FIG. 13 shows that L beams are transmitted in one time of beam sweeping. Moreover, the L beams indicate beams transmitted in directions different from each other. The terminal apparatus is difficult to recognize which of the L beams is the beam transmitted in its own direction, so the terminal apparatus first attempts to receive all of the L beams. Then, the terminal apparatus identifies a beam that has higher received power and capable of receiving the MBMS session desired to be delivered. Then, the terminal apparatus can be necessary to receive the previously identified beam in accordance with the beam sweeping period corresponding to the MBMS session. As illustrated in FIG. 13, the beam sweeping configuration for recognizing the time and frequency location where the beam sweeping is being performed is set for the number of MBMS sessions.

Figure 14:
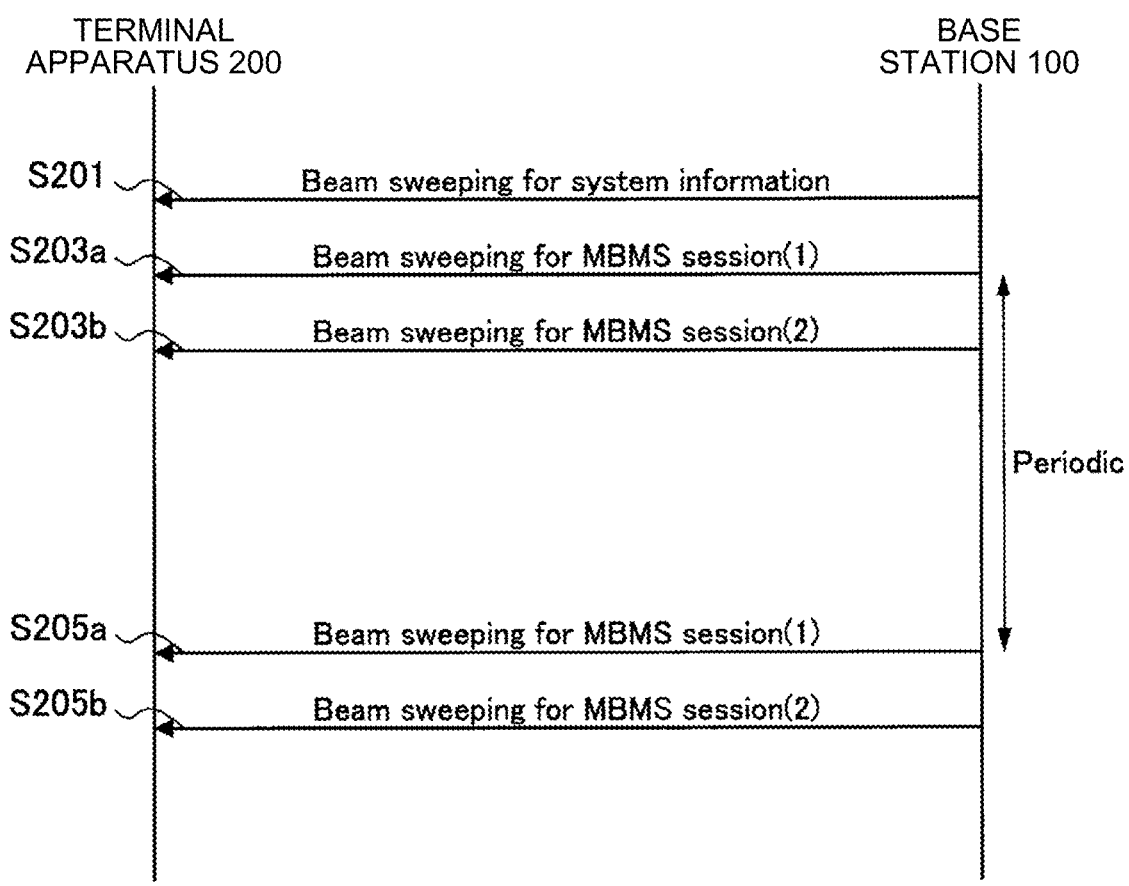
FIG. 14 is a schematic sequence diagram illustrating an example of a procedure for providing a program to each terminal apparatus using a directional beam.

An example of a procedure for providing a program to each terminal apparatus using a directional beam is now described with reference to FIG. 14, by particularly focusing on the beam sweeping described above. FIG. 14 is a schematic sequence diagram illustrating an example of a procedure for providing a program to each terminal apparatus using a directional beam.

As illustrated in FIG. 14, the base station 100 (the communication control unit 151) first performs the beam sweeping to provide system information. This causes the base station 100 (the notification unit 155) to notify the terminal apparatus 200 of the system information. This enables the terminal apparatus 200 (the information acquisition unit 243) to acquire information regarding the beam sweeping configuration for each MBMS session from the system information notified from the base station 100 (S201).

Then, the base station 100 (the communication control unit 151) sequentially executes beam sweeping corresponding to the program (i.e., the beam sweeping corresponding to the MBMS session) for each program on the basis of the beam sweeping configuration for each MBMS session (S203a and S203b). In addition, the base station 100 can periodically execute the beam sweeping for each program at a predetermined period (S205a and S205b).

Figure 15:
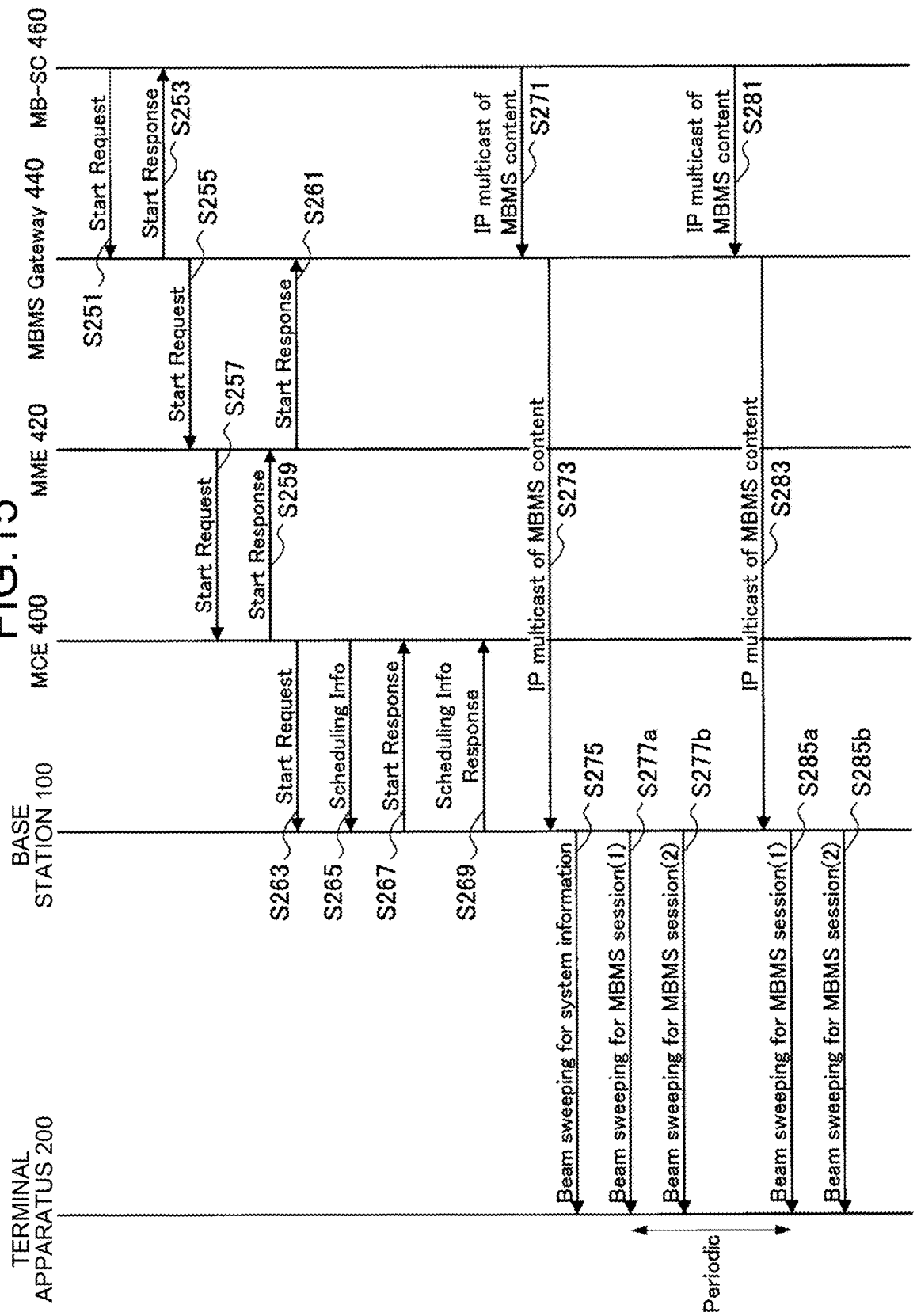
FIG. 15 is an explanatory diagram illustrating an example of a procedure for providing a program to each terminal apparatus using a directional beam.

The description of the procedure illustrated in FIG. 14 is now given in more detail with reference to FIG. 15. FIG. 15 is an explanatory diagram illustrating an example of the procedure for providing a program to each terminal apparatus using a directional beam and is a sequence diagram illustrating in more detail the procedure shown in FIG. 14, including the procedure for MBMS. Moreover, in FIG. 15, the steps denoted by reference numerals S251 to S269 are substantially similar to the steps denoted by reference numerals S121 to S139 in FIG. 7, respectively, and so a detailed description thereof is omitted.

In a case where the MB-SC 460 transfers (IP multicasts) the target MBMS content to the MBMS gateway 440 (S271), the MBMS content is IP multicast from the MBMS gateway 440 to the base station 100 (S271). The base station 100, when receiving the MBMS content from the MBMS gateway 440, first performs the beam sweeping to provide system information (S275). Moreover, the step indicated by reference numeral S275 corresponds to the step indicated by reference numeral S201 in FIG. 14.

Next, the base station 100 sequentially executes beam sweeping corresponding to the program (i.e., the beam sweeping corresponding to the MBMS session) for each program on the basis of the beam sweeping configuration for each MBMS session (S277a and S277b). Moreover, the step indicated by reference numerals S277a and S277b corresponds to the step indicated by reference numerals S203a and S203b in FIG. 14.

Subsequently, in a case where the MB-SC 460 transfers (IP multicast) the MBMS content again to the MBMS gateway 440 (S281), the MBMS content is IP multicast from the MBMS gateway 440 to the base station 100 in a similar manner to that described above (S283). The base station 100, when receiving the MBMS content from the MBMS gateway 440, executes the beam sweeping corresponding to the program again for each program on the basis of the beam sweeping configuration for each MBMS session (S285a and S285b). Moreover, the step indicated by reference numerals S285a and S285b corresponds to the step indicated by reference numerals S205a and S205b in FIG. 14.

The basic configuration of the communication system according to an embodiment of the present disclosure is described above with reference to FIGS. 9 to 15.

First Modification

Subsequently, a modification of the communication system according to an embodiment of the present disclosure is described. Moreover, the present modification is also referred to as a "first modification".

In a case where delivery to an unspecified number of terminal apparatuses is assumed, it is desirable for the beam sweeping performed to provide a program to a terminal apparatus (i.e., beam sweeping performed to deliver an MBMS session to a terminal apparatus) to provide the beam in as many directions as possible using many beams. Such control however causes limited frequency and time resources for the MBMS service to be wasted, resulting in, in some cases, limiting the communication capacity for normal unicast downlink. From such a background, in 5G MBMS, it is important to configure the beam sweeping more suitably depending on the tendency of the terminal apparatus desiring delivery.

Moreover, the function of a terminal apparatus requesting for delivering an MBMS session (i.e., a terminal apparatus in which a user is interested in a program) giving a notification to a base station is implemented by a function called counting in LTE. In the present modification, there is provided technology enabling the terminal apparatus receiving the MBMS session to notify the base station of information indicating the direction in which the beam transmitted for the reception is being used, so that an extra beam sweeping is further reduced.

A description of an overview of the difference between counting and beam identification (i.e., information indicating which beam is used for reception) is now given. In the counting, the base station is notified of which program the terminal apparatus desires to deliver. In LTE, the MBMS session is delivered using an omnidirectional antenna (i.e., broadcasting is performed), so there is unnecessary to notify the base station of which beam the terminal apparatus desires to deliver the program with using the beam. In 5G, in addition to information notified from a terminal apparatus to a base station in the existing counting (e.g., counting in LTE), in one example, information indicating which beam the program is desired to receive is necessary.

In view of such a situation, in the communication system according to the present modification, the terminal apparatus gives a report regarding beam sweeping for MBMS (i.e., beam report) to the base station.

Specifically, first, the base station performs the beam reference sweeping for MBMS to provide beams in as many directions as possible for each MBMS session. Each beam transmitted in the beam reference sweeping includes a reference signal (reference signal) for measuring the received power of the beam. For the reference signal, different settings can be applied to each beam, or common settings can be applied to a plurality of beams.

The terminal apparatus receives the beam transmitted by the beam reference sweeping for MBMS and identifies the desired beam for receiving the content of the program corresponding to the desired MBMS session on the basis of, in one example, reference signal received power (RSRP). Then, the terminal apparatus reports the beam ID of the identified beam to the base station (performs beam reporting). Moreover, the information notified from the terminal apparatus to the base station by the report corresponds to an example of "third information". In addition, in other words, the terminal apparatus reports, as beam reporting, the content corresponding to the program is desired to be delivered using which beam. In other words, like the above-mentioned report (beam reporting) from the terminal apparatus to the base station, it can be said that information notified from the terminal apparatus to the base station in order for the base station to perform counting corresponds to an example of a request for delivery of content corresponding to the program.

Moreover, the period of beam reference sweeping is desirably set to be equal to or longer than the period of beam sweeping (the beam sweeping for MBMS session) for transmitting the content of the program corresponding to the MBMS session.

Further, the terminal apparatus does not necessarily notify a beam ID as beam reporting for beam reference sweeping. This is because, in one example, in a case where any of a plurality of terminal apparatuses reports a corresponding beam ID to the base station, the base station is capable of recognizing the corresponding beam is being used even if not all of the plurality of terminal apparatuses reports. On the other hand, in a case where at least some of the beams are not reported as beam reporting that the beam is necessary from any of the terminal apparatuses, the base station can be unnecessary to provide the content of the program corresponding to the MBMS session using the beam. The determination can be appropriately set depending on the implementation of the base station.

Figure 16:
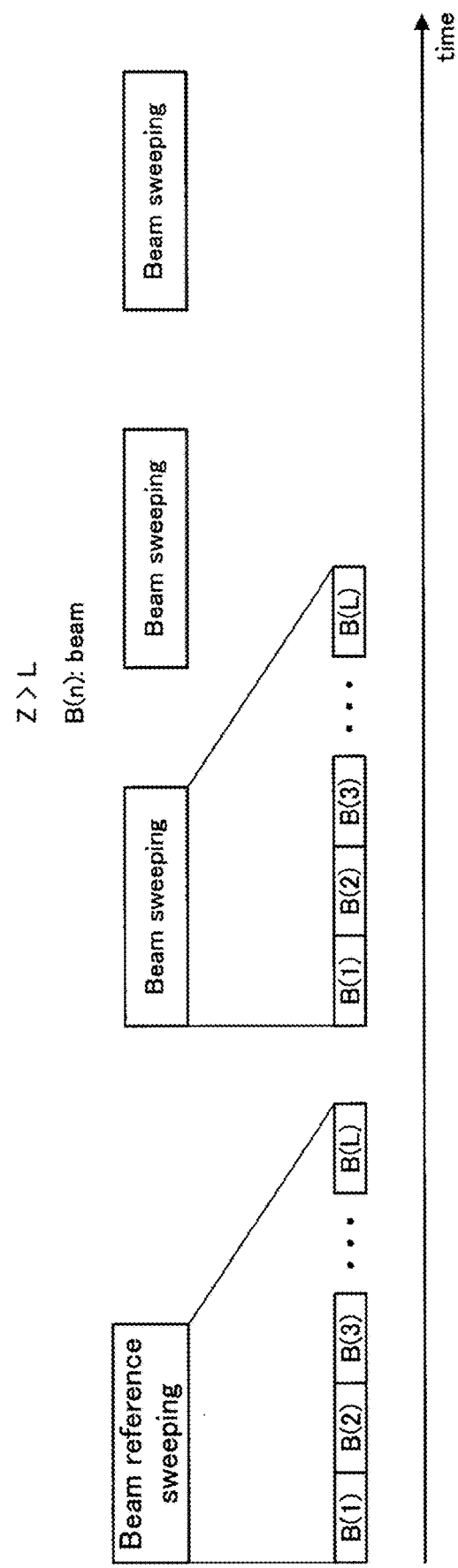
FIG. 16 is an explanatory diagram illustrating the relationship between the beam reference sweeping and the beam sweeping for MBMS session.

A description of the relationship between the beam reference sweeping and the beam sweeping for MBMS session is now given with reference to FIG. 16. FIG. 16 is an explanatory diagram illustrating the relationship between the beam reference sweeping and the beam sweeping for MBMS session. In one example, the period of the beam reference sweeping is set to be every 1 sec, and the period of the beam sweeping for MBMS session is set to be every 10 ms. The number Z of beams provided by the beam reference sweeping is set to be equal to or larger than the number L of beams provided by the beam sweeping for MBMS session ($Z \geq L$). Moreover, the beam reference sweeping corresponds to an example of "second sweeping", and a beam provided by the beam reference sweeping corresponds to an example of a "second directional beam". On the other hand, the beam sweeping for MBMS session corresponds to an example of "first sweeping", and a beam provided by the beam sweeping for MBMS session corresponds to an example of a "first directional beam".

Figure 17:
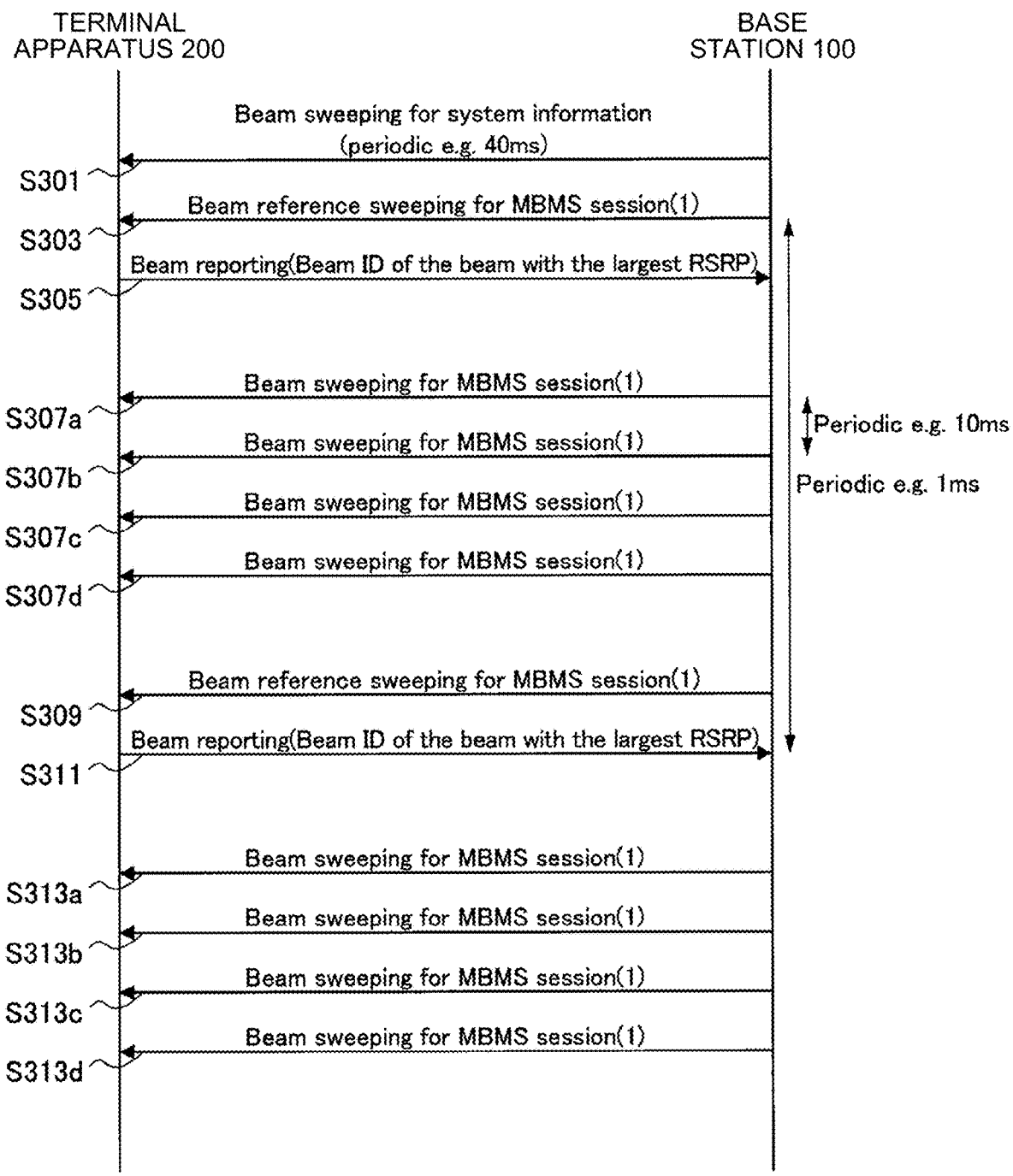
FIG. 17 is a schematic sequence diagram illustrating an example of a procedure between a base station and a terminal apparatus for providing a program to each terminal apparatus using a directional beam in a communication system according to a first modification.

An example of a procedure between a base station and a terminal apparatus for providing a program to each terminal apparatus using a directional beam in the communication system according to the present modification is now described with reference to FIG. 17. FIG. 17 is a schematic sequence diagram illustrating an example of a procedure between a base station and a terminal apparatus for providing a program to each terminal apparatus using a directional beam in the communication system according to the present modification. Moreover, for convenience of description, a series of procedures are now described focusing on a case where the base station 100 delivers the MBMS content of the program corresponding to the MBMS session (1).

As illustrated in FIG. 17, the base station 100 (the communication control unit 151) first performs the beam sweeping to provide the system information (S301). Subsequently, the base station 100 (the communication control unit 151) performs the beam reference sweeping for each program. In other words, in the example illustrated in FIG. 17, the base station 100 performs the beam reference sweeping on the program corresponding to the MBMS session (1) (S303). The terminal apparatus 200 (the measuring unit 245) measures the RSRP of each beam transmitted from the base station 100 by the beam reference sweeping and identifies a desired beam to receive the content of the program corresponding to the MBMS session (1) depending on a result of the measurement. The terminal apparatus 200 (the notification unit 247) reports a beam ID of the identified beam to the base station 100 (S305). Then, base station 100 (the communication control unit 151) executes the beam sweeping (i.e., the beam sweeping for MBMS session) for delivering the content of the program corresponding to the MBMS session (1) at a predetermined period (e.g., 10 ms) in response to the report from terminal apparatus 200 (S307a to S307d).

Further, the base station 100 (the communication control unit 151) performs the beam reference sweeping for each program at a predetermined period (e.g., 1 sec) (S309). In this case, the terminal apparatus 200 measures the RSRP of each beam transmitted from the base station 100 again by the beam reference sweeping and reports the beam ID of the specified beam depending on a result of the measurement to the base station 100 (S311). In addition, the base station 100 (the communication control unit 151) executes the beam sweeping for MBMS session in response to the report from the terminal apparatus 200 (S313a to S313d).

The control as described above makes it also possible for the base station 100 to limit the beam sweeping (e.g., limit the direction in which beams are transmitted, the number of beams, etc.) for delivering the content of the program for each program (i.e., for each MBMS session) depending on the distribution of the terminal apparatuses 200 that desire to deliver the program. In other words, the communication system according to the first modification makes it possible to reduce the frequency of the occurrence of the situation where extra beam sweeping is performed (e.g., a situation where a beam is transmitted in a direction where there is no terminal apparatus 200 that desires delivery). This enables the communication system according to the present modification to optimize the use of frequency and time resources in the entire system depending on the situation.

Second Modification

Subsequently, a modification of the communication system according to another embodiment of the present disclosure is described. Moreover, the present modification is also referred to as a "second modification".

In the first modification, the measurement result (e.g., the measurement result of RSRP) using the reference signal included in the beam transmitted in the beam reference sweeping is reported from the terminal apparatus to the base station as the beam reporting.

On the other hand, in a case where the terminal apparatus sends a notification such as the beam reporting to the base station, the terminal apparatus is necessary to be in a state called RRC connected, that is, in a state where the terminal apparatus and the base station can communicate. In other words, in a case where the terminal apparatus is in a state where UL communication between the terminal apparatus and the base station, which is called RRC idle, is restricted, the terminal apparatus is necessary to make a transition from the RRC idle state to the RRC connected state for the beam reporting.

On the other hand, to make a transition of the state from RRC idle to RRC connected, predetermined signaling between the terminal apparatus and the base station is necessary. Such a situation in which signaling occurs due to the state transition can be a heavy burden on a terminal apparatus that uses only the DL while maintaining the RRC idle state and desires to receive the provision of the MBMS service. In addition, in a situation where an unspecified number of terminal apparatuses receives the provision of the MBMS service (i.e., a situation where the delivery of MBMS content is received), a case where UL throughput is reduced can be assumed by allocating UL resources individually to a plurality of the terminal apparatuses for beam reporting.

In view of such a situation, in the communication system according to the present modification, the terminal apparatus performs the beam reporting using the random access procedure. Specifically, in the communication system according to the present modification, the terminal apparatus receives a beam transmitted from the base station in the beam reference sweeping and is provided with an area (window) for performing the beam reporting on the base station. Under such a configuration, the terminal apparatus transmits UL using different sequences for each beam ID within the range of the window. Moreover, in such a configuration, UL transmissions from a plurality of terminal apparatuses collide within the window in some cases. Even in such a case, it is possible to separate those having different sequences. In addition, a case where a plurality of terminal apparatuses performs the beam reporting for the same beam ID can be assumed. In such a case, the same sequence is used for the same beam ID, so a collision of UL transmission from each of the plurality of terminal apparatuses occurs in some cases. Even in such a case, the base station is capable of recognizing that at least one terminal apparatus desires to provide the MBMS service using the beam indicated by the beam ID, which is not a problem for system operation.

Figure 18:
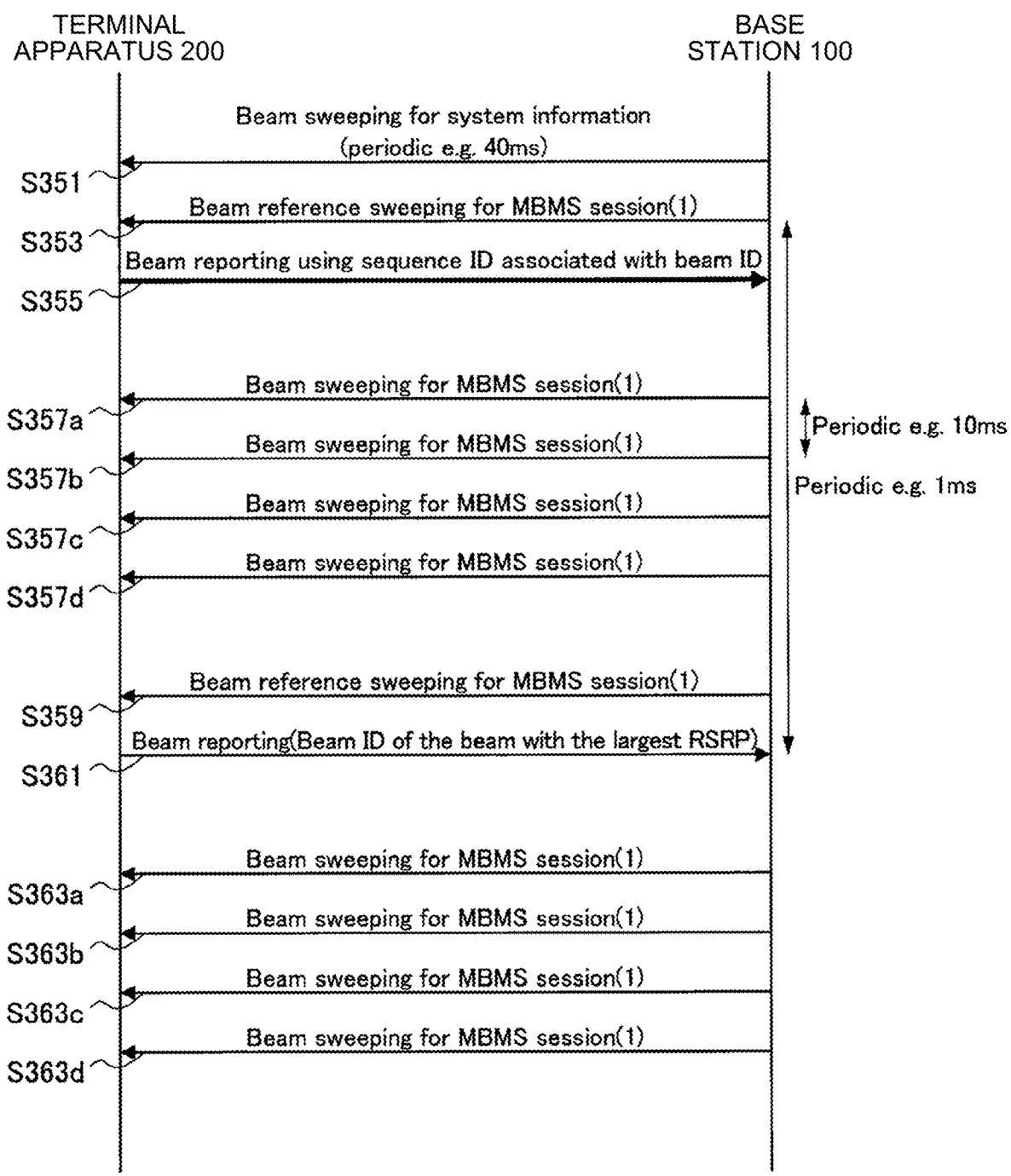
FIG. 18 is a schematic sequence diagram illustrating an example of a procedure between a base station and a terminal apparatus for providing a program to each terminal apparatus using a directional beam in a communication system according to a second modification.

A description of an example of a procedure between a base station and a terminal apparatus for providing a program to each terminal apparatus using a directional beam in the communication system according to the present modification is now given with reference to FIG. 18. FIG. 18 is a schematic sequence diagram illustrating an example of a procedure between a base station and a terminal apparatus for providing a program to each terminal apparatus using a directional beam in the communication system according to the present modification. Moreover, for convenience of description, a series of procedures are now described focusing on a case where the base station 100 delivers the MBMS content of the program corresponding to the MBMS session (1).

As illustrated in FIG. 18, the base station 100 (the communication control unit 151) first performs the beam sweeping to provide the system information (S351). Subsequently, the base station 100 (the communication control unit 151) performs the beam reference sweeping for each program. In other words, in the example illustrated in FIG. 18, the base station 100 performs the beam reference sweeping on the program corresponding to the MBMS session (1) (S353). The terminal apparatus 200 (the measuring unit 245) measures the RSRP of each beam transmitted from the base station 100 by the beam reference sweeping and identifies a desired beam to receive the content of the program corresponding to the MBMS session (1) depending on a result of the measurement. The terminal apparatus 200 (the notification unit 247) performs the beam reporting using a sequence corresponding to the beam ID of the identified beam within the window provided for performing the beam reporting (S355). This allows the beam ID to be reported from the terminal apparatus 200 to the base station 100.

Moreover, the subsequent processing is similar to the example described with reference to FIG. 17. In other words, the steps denoted by reference numerals S357a to S357d and S363a to S363d are substantially similar to those of reference numerals S307a to 307d and S313a to S313d in FIG. 17. In addition, the base station 100 (the communication control unit 151) can perform the beam reference sweeping for each program at a predetermined period (e.g., 1 sec) (S359), which is similar to the example illustrated in FIG. 17. In this case, in one example, in a case where the terminal apparatus 200 is in the RRC connected state, the terminal apparatus 200 can be necessary to perform the beam reporting in a similar manner to the procedure indicated by the reference numeral S311 in FIG. 17. In addition, in a case where the terminal apparatus 200 is in the RRC idle state, the terminal apparatus 200 can be necessary to perform the beam reporting in a similar manner to the procedure indicated by reference numeral S355.

The control as described above makes it possible for the terminal apparatus 200 to perform the beam reporting to the base station 100 in the RRC idle state. For this reason, it is unnecessary for the terminal apparatus 200 to make a transition to the RRC connected state to perform the beam reporting, resulting in reducing the processing load of the terminal apparatus 200. In addition, it is unnecessary for the terminal apparatus 200 to make a transition to the RRC connected state to perform the beaming reporting, so the frequency of signaling for making a transition from the RRC idle state to the RRC connected state is reduced, resulting in reducing the decrease in UL throughput due to the signaling.

Third Modification

Subsequently, a modification of the communication system according to another embodiment of the present disclosure is described. Moreover, the present modification is also referred to as a "third modification".

The example in which the beam reference sweeping is performed for each MBMS session (i.e., for each program) is described in the first and second modifications. On the other hand, in the present modification, an example of a technique for further reducing the number of beams used for the beam reference sweeping by sharing the beam reference sweeping between different MBMS sessions is described.

As described above, the terminal apparatus, when performing the beam reporting, notifies the base station of an MBMS session ID corresponding to the program desired to be delivered and a beam ID of the beam used for delivery of the content of the program. The terminal apparatus in the RRC connected state can easily include the MBMS session ID and the beam ID described above in the beam report.

On the other hand, as described in the second modification, in the case where the technique of transmitting a sequence in the random access procedure is applied, a window for transmitting the sequence can be divided into a plurality of areas for each of the MBMS session ID and beam ID described above. This makes it possible to transmit individually a sequence for each MBMS session ID and beam ID.

Figure 19:
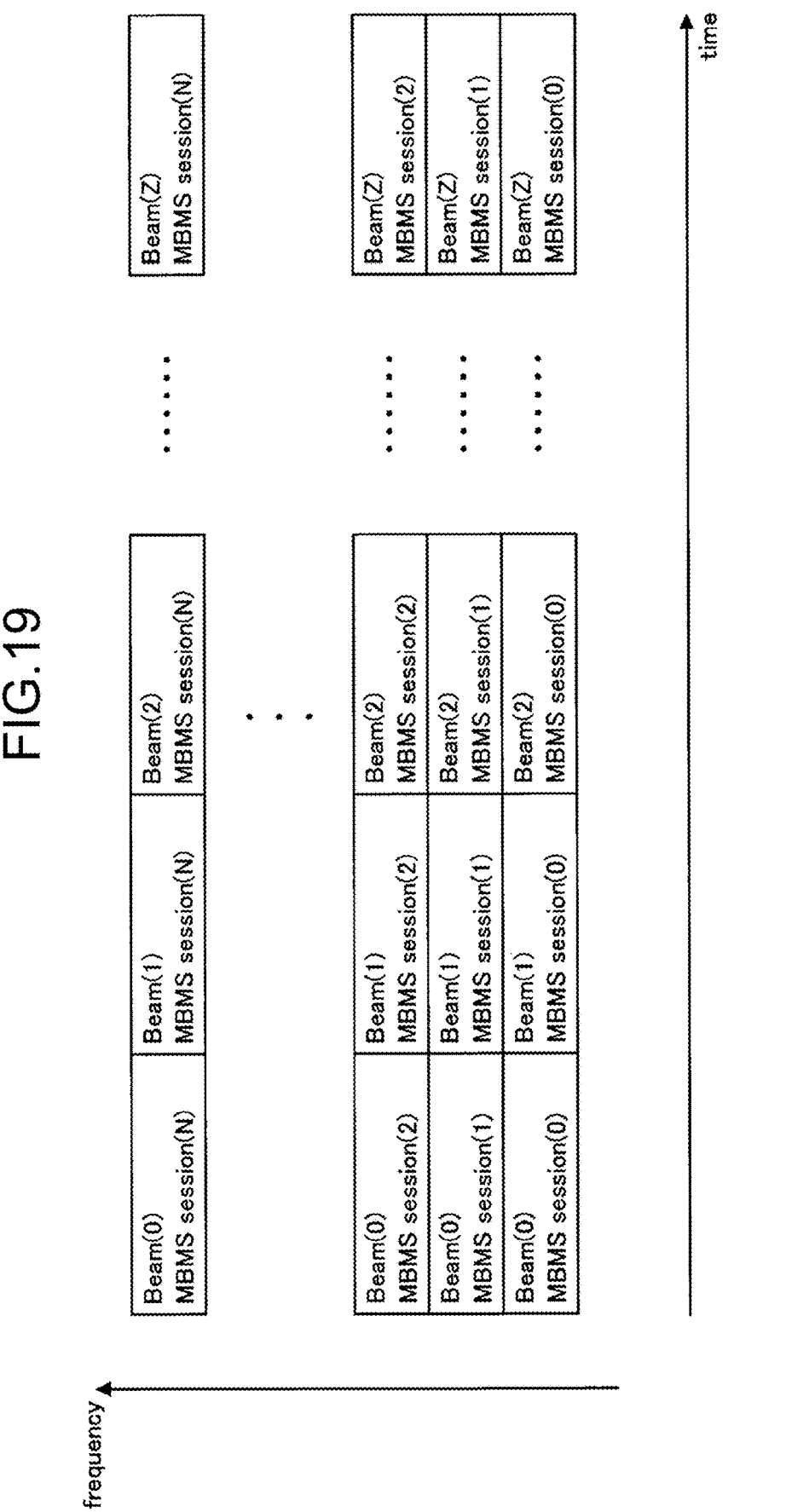
FIG. 19 is an explanatory diagram illustrating an overview of a communication system according to a third modification.

In one example, FIG. 19 is an explanatory diagram illustrating an overview of the communication system according to the present modification and illustrates an example of a method of dividing a window for transmitting a sequence in the random access procedure into areas for each MBMS session ID and beam ID. In one example, in the example illustrated in FIG. 19, the window is divided into a plurality of areas in the frequency direction and the time direction by TDM and FDM, and a combination of an MBMS session ID and a beam ID is associated with each of the divided areas.

In other words, the terminal apparatus selects a resource corresponding to a beam used to deliver the content of the program from the resources corresponding to the program desired to be delivered (i.e., the MBMS session ID) among the windows that are set as the resources for performing the beam reporting. Then, the terminal apparatus performs UL transmission using a predetermined sequence in the random access procedure using the selected resource. Moreover, in this case, all terminal apparatuses are capable of performing the reporting (i.e., performing transmission of the sequence) using a common sequence irrespective of the program desired to be delivered or the beam used for delivering the content of the program.

The control as described above makes it possible for the communication system according to the present modification to share the beam reference sweeping between different MBMS sessions, so the number of beams used for the beam reference sweeping can be further reduced. The communication system according to the present modification thus makes it also possible to optimize resources used for communication in the entire system.

Fourth Modification

Subsequently, a modification of the communication system according to another embodiment of the present disclosure is described. Moreover, the present modification is also referred to as a "fourth modification".

In the first to third modifications, the examples are described in which the terminal apparatus performs the beam reporting every time the beam reference sweeping is performed. On the other hand, in the present modification, an example of a technique is described in which any one of a plurality of terminal apparatuses performs the beam reporting as necessary, thereby further reducing the load on the terminal apparatus associated with the beam reporting.

Specifically, in a case where, for a certain session ID (a program), a report (i.e., beam reporting) of a beam ID (i.e., a beam used for delivering the program) is made from any terminal apparatus to the base station, the other terminal apparatuses do not necessarily make a similar report (i.e., a request for delivering content using the corresponding beam). This is because the base station is at least capable of recognizing that there is a terminal apparatus desiring to deliver the program corresponding to the session ID using the beam corresponding to the beam ID by allowing at least some of the terminal apparatuses to report a beam ID for a certain session ID. On the other hand, to implement the control as described above, the terminal apparatus is necessary to recognize whether the beam reporting is being performed (i.e., the use condition of the beam for each program) for a combination of a program to be delivered (i.e., a session ID) and a beam used for delivering the program (i.e., a beam ID).

In view of the above situation, in the communication system according to the present modification, the base station provides the terminal apparatus with information indicating the use condition of the beam for each program in association with information commonly notified to a plurality of terminal apparatuses such as system information.

Figure 20:
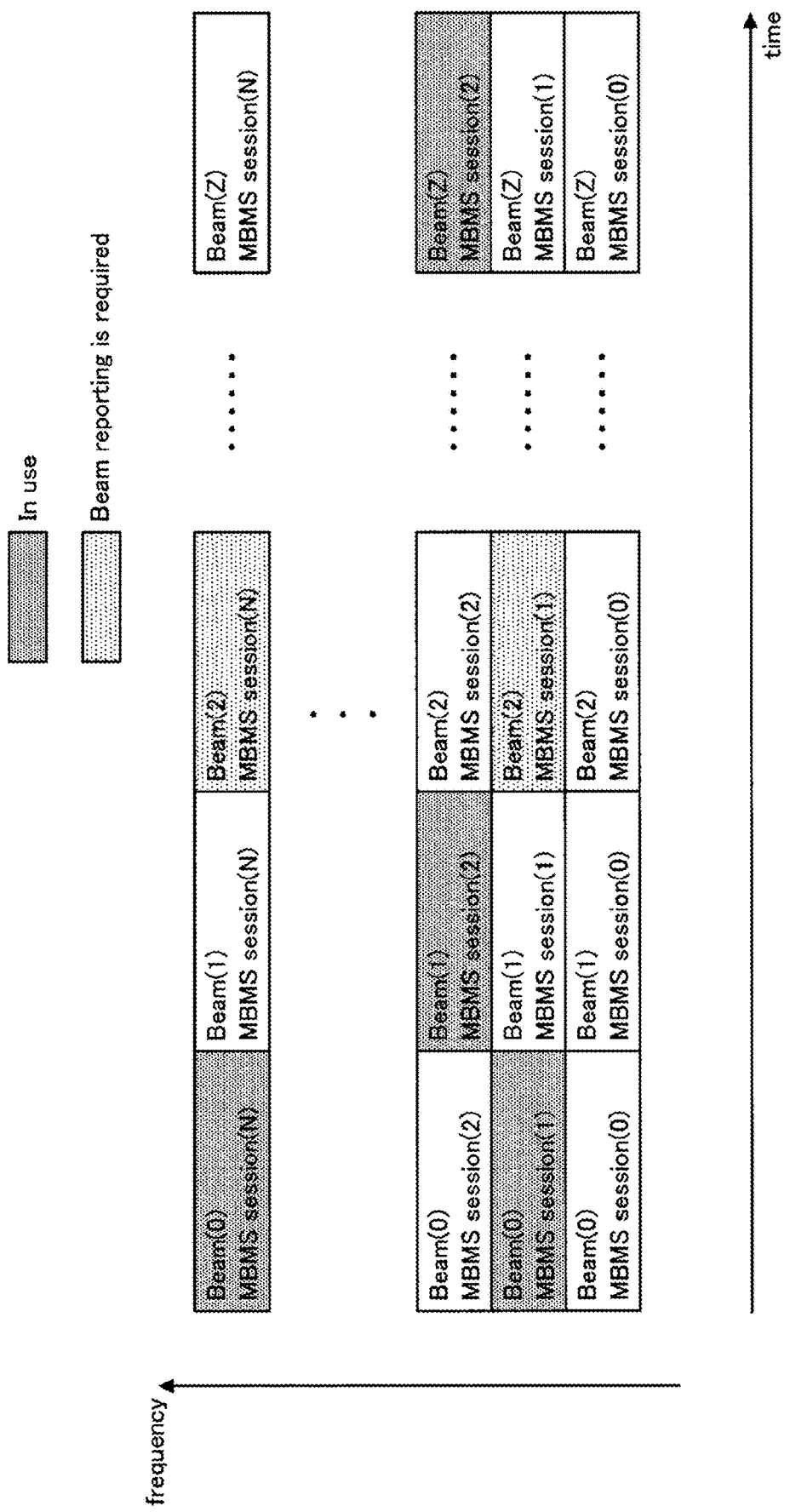
FIG. 20 is an explanatory diagram illustrating an overview of a communication system according to a fourth modification.

In one example, FIG. 20 is an explanatory diagram illustrating an overview of the communication system according to the present modification and schematically illustrates an example of the information provided from a base station to a terminal apparatus and indicating the use condition of a beam for each program. Moreover, information indicating the use condition of the beam for each program as illustrated in FIG. 20 corresponds to an example of "fourth information".

The information denoted as "In use" in FIG. 20 indicates that the delivery of the content by the beam associated with the information is continuing for the MBMS session associated with the information.

Further, the information denoted as "Beam reporting is required" indicates that the delivery of the content by the beam associated with the information is continuing for the MBMS session associated with the information but indicates that the delivery may be stopped within a given period of time. In other words, the delivery of the content corresponding to the MBMS session using the beam is stopped in the case where the beam reporting is not performed from any terminal apparatus within the period.

Further, another information except that described above (i.e., information that is not hatched) indicates that the delivery of the content by the beam associated with the information is not performed for the MBMS session associated with the information.

Under such a configuration, in a case where, in one example, the terminal apparatus does not desire to stop the delivery of the content based on the settings (i.e., the session ID and the beam ID) associated with the information indicated as "Beam reporting is required", the beam reporting corresponding to the settings can be necessary to be performed. Specifically, the terminal apparatus can measure the reference signal in the beam transmitted by the beam reference sweeping and can be necessary to perform the beam reporting depending on a result of the measurement. In this case, the base station can modify the information corresponding to the session ID and the beam ID indicated by the beam reporting transmitted from the terminal apparatus from "Beam reporting is required" to "In use". Moreover, the beam transmitted by the beam reference sweeping is capable of being received by any terminal apparatus within the communication range (cell), and so it corresponds to a cell-specific beam.

The control as described above enables the terminal apparatus to recognize, for the program desired to be delivered, the use condition of the beam for delivering the program to itself on the basis of the information provided from the base station. This allows the terminal apparatus to be necessary to perform the beam reporting to the base station only in a case where, for example, delivery of the content of the program using the beam is stopped or can be probably stopped. This makes it possible to further reduce the load on the terminal apparatus by performing the beam reporting.

4. APPLICATION EXAMPLES

The technology according to the present disclosure can be applied to various products. For example, the base station 100 may be realized as any type of evolved Node B (eNB) such as a macro eNB or a small eNB. The small eNB may be an eNB that covers a cell, such as a pico eNB, a micro eNB, or a home (femto) eNB, smaller than a macrocell. Instead, the base station 100 may be realized as another type of base station such as a NodeB or a base transceiver station (BTS). The base station 100 may include a main entity (also referred to as a base station device) that controls wireless communication and one or more remote radio heads (RRHs) disposed at different locations from the main entity. Further, various types of terminals to be described below may operate as the base station 100 by performing a base station function temporarily or semi-permanently. Further, at least one of constituent elements of the base station 100 may be realized in the base station device or a module for the base station device.

Further, for example, the terminal apparatus 200 may be realized as a mobile terminal such as a smartphone, a tablet personal computer (PC), a notebook PC, a portable game terminal, a portable/dongle mobile router or a digital camera, or an in-vehicle terminal such as a car navigation apparatus. Further, the terminal apparatus 200 may be realized as a terminal that performs machine to machine (M2M) communication (also referred to as a machine type communication (MTC) terminal). Further, the terminal apparatus 200 may be realized as a so-called "low cost terminal", such as an MTC terminal, an eMTC terminal, or an NB-IoT terminal. Moreover, at least a part of the constituent elements of the terminal apparatus 200 may be realized in a module mounted on the terminal (for example, an integrated circuit module configured on one die).

4.1. Application Examples for Base Station

First Application Example

Figure 21:
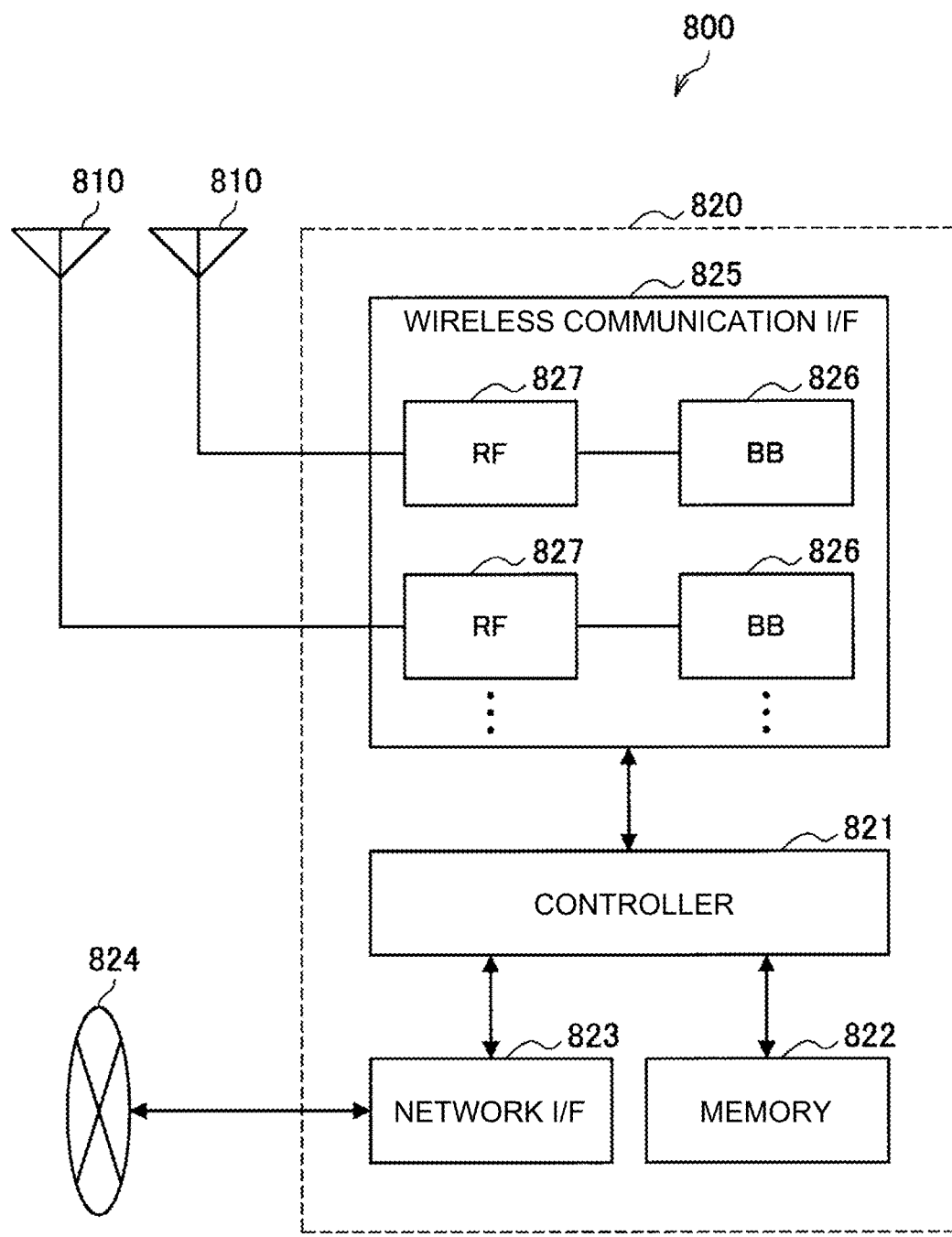
FIG. 21 is a block diagram illustrating a first example of a schematic configuration of an eNB.

FIG. 21 is a block diagram illustrating a first example of a schematic configuration of an eNB to which the technology according to the present disclosure may be applied. An eNB 800 includes one or more antennas 810 and a base station device 820. Each antenna 810 and the base station device 820 may be connected to each other via an RF cable.

Each of the antennas 810 includes a single or a plurality of antenna elements (e.g., a plurality of antenna elements constituting a MIMO antenna) and is used for the base station device 820 to transmit and receive a wireless signal. The eNB 800 may include the plurality of the antennas 810 as illustrated in FIG. 21, and the plurality of antennas 810 may, for example, correspond to a plurality of frequency bands used by the eNB 800. It should be noted that while FIG. 21 illustrates an example in which the eNB 800 includes the plurality of antennas 810, the eNB 800 may include the single antenna 810.

The base station device 820 includes a controller 821, a memory 822, a network interface 823, and a wireless communication interface 825.

The controller 821 may be, for example, a CPU or a DSP, and operates various functions of an upper layer of the base station device 820. For example, the controller 821 generates a data packet from data in a signal processed by the wireless communication interface 825, and transfers the generated packet via the network interface 823. The controller 821 may generate a bundled packet by bundling data from a plurality of base band processors to transfer the generated bundled packet. Further, the controller 821 may also have a logical function of performing control such as radio resource control, radio bearer control, mobility management, admission control, and scheduling. Further, the control may be performed in cooperation with a surrounding eNB or a core network node. The memory 822 includes a RAM and a ROM, and stores a program executed by the controller 821 and a variety of control data (such as, for example, terminal list, transmission power data, and scheduling data).

The network interface 823 is a communication interface for connecting the base station device 820 to the core network 824. The controller 821 may communicate with a core network node or another eNB via the network interface 823. In this case, the eNB 800 may be connected to a core network node or another eNB through a logical interface (e.g., S1 interface or X2 interface). The network interface 823 may be a wired communication interface or a wireless communication interface for wireless backhaul. In the case where the network interface 823 is a wireless communication interface, the network interface 823 may use a higher frequency band for wireless communication than a frequency band used by the wireless communication interface 825.

The wireless communication interface 825 supports a cellular communication system such as long term evolution (LTE) or LTE-Advanced, and provides wireless connection to a terminal located within the cell of the eNB 800 via the antenna 810. The wireless communication interface 825 may typically include a base band (BB) processor 826, an RF circuit 827, and the like. The BB processor 826 may, for example, perform encoding/decoding, modulation/demodulation, multiplexing/demultiplexing, and the like, and performs a variety of signal processing on each layer (e.g., L1, medium access control (MAC), radio link control (RLC), and packet data convergence protocol (PDCP)). The BB processor 826 may have part or all of the logical functions as described above instead of the controller 821. The BB processor 826 may be a module including a memory having a communication control program stored therein, a processor to execute the program, and a related circuit, and the function of the BB processor 826 may be changeable by updating the program. Further, the module may be a card or blade to be inserted into a slot of the base station device 820, or a chip mounted on the card or the blade. Meanwhile, the RF circuit 827 may include a mixer, a filter, an amplifier, and the like, and transmits and receives a wireless signal via the antenna 810.

The wireless communication interface 825 may include a plurality of the BB processors 826 as illustrated in FIG. 21, and the plurality of BB processors 826 may, for example, correspond to a plurality of frequency bands used by the eNB 800. Further, the wireless communication interface 825 may also include a plurality of the RF circuits 827, as illustrated in FIG. 21, and the plurality of RF circuits 827 may, for example, correspond to a plurality of antenna elements. Note that FIG. 21 illustrates an example in which the wireless communication interface 825 includes the plurality of BB processors 826 and the plurality of RF circuits 827, but the wireless communication interface 825 may include the single BB processor 826 or the single RF circuit 827.

In the eNB 800 illustrated in FIG. 21, one or more constituent elements (for example, at least one of the communication control unit 151, the information acquisition unit 153, or the notification unit 155) included in the processing unit 150 described with reference to FIG. 2 may be implemented in the wireless communication interface 825. Alternatively, at least some of the constituent elements may be implemented in the controller 821. As one example, a module including a part or the whole of (for example, the BB processor 826) of the wireless communication interface 825 and/or the controller 821 may be implemented on the eNB 800. The one or more constituent elements in the module may be implemented in the module. In this case, the module may store a program causing a processor to function as the one or more constituent elements (in other words, a program causing the processor to execute operations of the one or more constituent elements) and execute the program. As another example, a program causing the processor to function as the one or more constituent elements may be installed in the eNB 800, and the wireless communication interface 825 (for example, the BB processor 826) and/or the controller 821 may execute the program. In this way, the eNB 800, the base station device 820, or the module may be provided as a device including the one or more constituent elements and a program causing the processor to function as the one or more constituent elements may be provided. In addition, a readable recording medium on which the program is recorded may be provided.

Further, in the eNB 800 illustrated in FIG. 21, the wireless communication unit 120 described with reference to FIG. 2 may be implemented in the wireless communication interface 825 (for example, the RF circuit 827). Further, the antenna unit 110 may be implemented in the antenna 810. In addition, the network communication unit 130 may be implemented in the controller 821 and/or the network interface 823. Further, the storage unit 140 may be implemented in the memory 822.

Second Application Example

Figure 22:
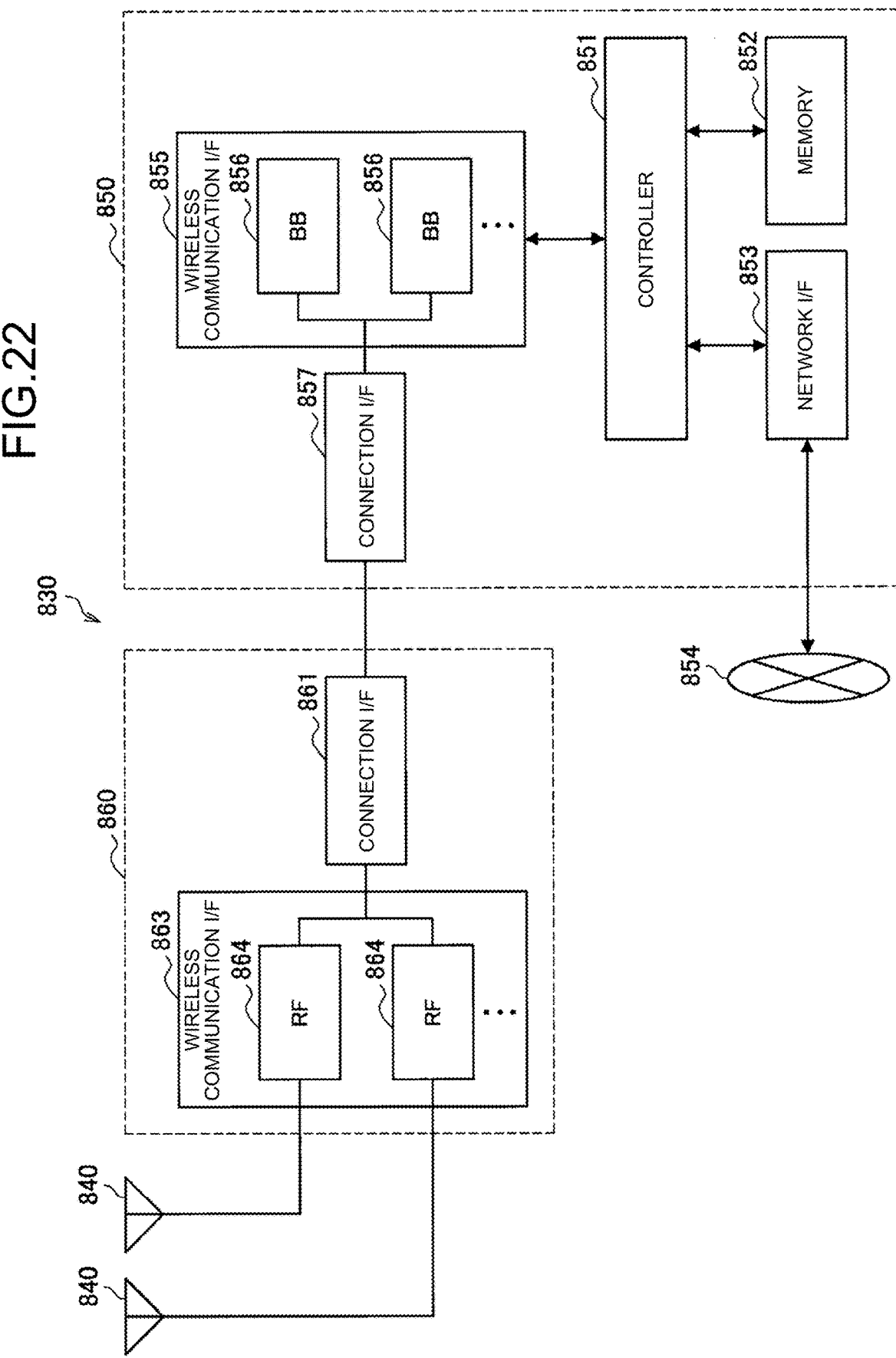
FIG. 22 is a block diagram illustrating a second example of the schematic configuration of the eNB.

FIG. 22 is a block diagram illustrating a second example of a schematic configuration of an eNB to which the technology according to the present disclosure may be applied. An eNB 830 includes one or more antennas 840, a base station device 850, and an RRH 860. Each of the antennas 840 and the RRH 860 may be connected to each other via an RF cable. Further, the base station device 850 and the RRH 860 may be connected to each other by a high speed line such as optical fiber cables.

Each of the antennas 840 includes a single or a plurality of antenna elements (e.g., a plurality of antenna elements constituting a MIMO antenna), and is used for the RRH 860 to transmit and receive a wireless signal. The eNB 830 may include a plurality of the antennas 840 as illustrated in FIG. 22, and the plurality of antennas 840 may, for example, correspond to a plurality of frequency bands used by the eNB 830. Note that FIG. 22 illustrates an example in which the eNB 830 includes the plurality of antennas 840, but the eNB 830 may include the single antenna 840.

The base station device 850 includes a controller 851, a memory 852, a network interface 853, a wireless communication interface 855, and a connection interface 857. The controller 851, the memory 852, and the network interface 853 are similar to the controller 821, the memory 822, and the network interface 823 described with reference to FIG. 21.

The wireless communication interface 855 supports a cellular communication system such as LTE and LTE-Advanced, and provides wireless connection to a terminal located in a sector corresponding to the RRH 860 via the RRH 860 and the antenna 840. The wireless communication interface 855 may typically include a BB processor 856 or the like. The BB processor 856 is similar to the BB processor 826 described with reference to FIG. 21 except that the BB processor 856 is connected to an RF circuit 864 of the RRH 860 via the connection interface 857. The wireless communication interface 855 may include a plurality of the BB processors 856, as illustrated in FIG. 21, and the plurality of BB processors 856 may, for example, correspond to a plurality of frequency bands used by the eNB 830. Note that FIG. 22 illustrates an example in which the wireless communication interface 855 includes the plurality of BB processors 856, but the wireless communication interface 855 may include the single BB processor 856.

The connection interface 857 is an interface for connecting the base station device 850 (wireless communication interface 855) to the RRH 860. The connection interface 857 may be a communication module for communication on the high speed line which connects the base station device 850 (wireless communication interface 855) to the RRH 860.

Further, the RRH 860 includes a connection interface 861 and a wireless communication interface 863.

The connection interface 861 is an interface for connecting the RRH 860 (wireless communication interface 863) to the base station device 850. The connection interface 861 may be a communication module for communication on the high speed line.

The wireless communication interface 863 transmits and receives a wireless signal via the antenna 840. The wireless communication interface 863 may typically include the RF circuit 864 or the like. The RF circuit 864 may include a mixer, a filter, an amplifier and the like, and transmits and receives a wireless signal via the antenna 840. The wireless communication interface 863 may include a plurality of the RF circuits 864 as illustrated in FIG. 22, and the plurality of RF circuits 864 may, for example, correspond to a plurality of antenna elements. Note that FIG. 22 illustrates an example in which the wireless communication interface 863 includes the plurality of RF circuits 864, but the wireless communication interface 863 may include the single RF circuit 864.

In the eNB 830 illustrated in FIG. 22, one or more constituent elements (at least one of the communication control unit 151, the information acquisition unit 153, or the notification unit 155) included in the processing unit 150 described with reference to FIG. 2 may be implemented in the wireless communication interface 855 and/or the wireless communication interface 863. Alternatively, at least some of the constituent elements may be implemented in the controller 851. As one example, a module including a part or the whole of (for example, the BB processor 856) of the wireless communication interface 855 and/or the controller 851 may be implemented on the eNB 830. The one or more constituent elements in the module may be implemented in the module. In this case, the module may store a program causing a processor to function as the one or more constituent elements (in other words, a program causing the processor to execute operations of the one or more constituent elements) and execute the program. As another example, a program causing the processor to function as the one or more constituent elements may be installed in the eNB 830, and the wireless communication interface 855 (for example, the BB processor 856) and/or the controller 851 may execute the program. In this way, the eNB 830, the base station device 850, or the module may be provided as a device including the one or more constituent elements and a program causing the processor to function as the one or more constituent elements may be provided. In addition, a readable recording medium on which the program is recorded may be provided.

Further, in the eNB 830 illustrated in FIG. 22, for example, the wireless communication unit 120 described with reference to FIG. 2 may be implemented in the wireless communication interface 863 (for example, the RF circuit 864). Further, the antenna unit 110 may be implemented in the antenna 840. In addition, the network communication unit 130 may be implemented in the controller 851 and/or the network interface 853. Further, the storage unit 140 may be implemented in the memory 852.

4.2. Application Examples for Terminal Apparatus

First Application Example

Figure 23:
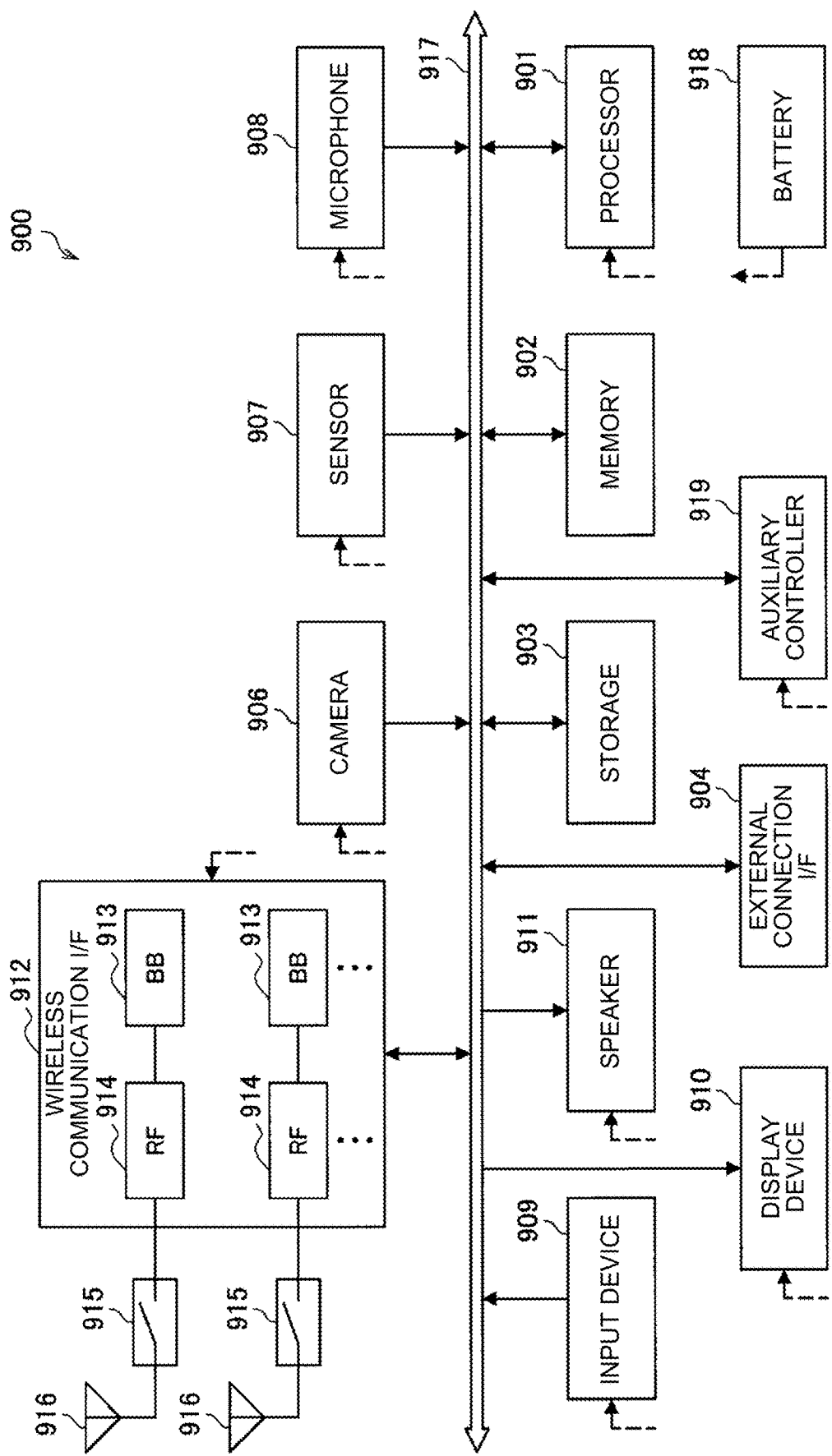
FIG. 23 is a block diagram illustrating an example of a schematic configuration of a smartphone.

FIG. 23 is a block diagram illustrating an example of a schematic configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on chip (SoC), and controls the functions of an application layer and other layers of the smartphone 900. The memory 902 includes a RAM and a ROM, and stores a program executed by the processor 901 and data. The storage 903 may include a storage medium such as semiconductor memories and hard disks. The external connection interface 904 is an interface for connecting the smartphone 900 to an externally attached device such as memory cards and universal serial bus (USB) devices.

The camera 906 includes, for example, an image sensor such as charge coupled devices (CCDs) and complementary metal oxide semiconductor (CMOS), and generates a captured image. The sensor 907 may include a sensor group including, for example, a positioning sensor, a gyro sensor, a geomagnetic sensor, an acceleration sensor and the like. The microphone 908 converts a sound that is input into the smartphone 900 to an audio signal. The input device 909 includes, for example, a touch sensor which detects that a screen of the display device 910 is touched, a key pad, a keyboard, a button, a switch or the like, and accepts an operation or an information input from a user. The display device 910 includes a screen such as liquid crystal displays (LCDs) and organic light emitting diode (OLED) displays, and displays an output image of the smartphone 900. The speaker 911 converts the audio signal that is output from the smartphone 900 to a sound.

The wireless communication interface 912 supports a cellular communication system such as LTE or LTE-Advanced, and performs wireless communication. The wireless communication interface 912 may typically include the BB processor 913, the RF circuit 914, and the like. The BB processor 913 may, for example, perform encoding/decoding, modulation/demodulation, multiplexing/demultiplexing, and the like, and performs a variety of types of signal processing for wireless communication. On the other hand, the RF circuit 914 may include a mixer, a filter, an amplifier, and the like, and transmits and receives a wireless signal via the antenna 916. The wireless communication interface 912 may be a one-chip module in which the BB processor 913 and the RF circuit 914 are integrated. The wireless communication interface 912 may include a plurality of BB processors 913 and a plurality of RF circuits 914 as illustrated in FIG. 23. Note that FIG. 23 illustrates an example in which the wireless communication interface 912 includes a plurality of BB processors 913 and a plurality of RF circuits 914, but the wireless communication interface 912 may include a single BB processor 913 or a single RF circuit 914.

Further, the wireless communication interface 912 may support other types of wireless communication system such as a short range wireless communication system, a near field communication system, and a wireless local area network (LAN) system in addition to the cellular communication system, and in this case, the wireless communication interface 912 may include the BB processor 913 and the RF circuit 914 for each wireless communication system.

Each antenna switch 915 switches a connection destination of the antenna 916 among a plurality of circuits (for example, circuits for different wireless communication systems) included in the wireless communication interface 912.

Each of the antennas 916 includes one or more antenna elements (for example, a plurality of antenna elements constituting a MIMO antenna) and is used for transmission and reception of the wireless signal by the wireless communication interface 912. The smartphone 900 may include a plurality of antennas 916 as illustrated in FIG. 23. Note that FIG. 23 illustrates an example in which the smartphone 900 includes a plurality of antennas 916, but the smartphone 900 may include a single antenna 916.

Further, the smartphone 900 may include the antenna 916 for each wireless communication system. In this case, the antenna switch 915 may be omitted from a configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies electric power to each block of the smartphone 900 illustrated in FIG. 23 via a feeder line that is partially illustrated in the figure as a dashed line. The auxiliary controller 919, for example, operates a minimally necessary function of the smartphone 900 in a sleep mode.

In the smartphone 900 illustrated in FIG. 23, one or more constituent elements included in the processing unit 240 (at least one of the communication control unit 241, the information acquisition unit 243, the measuring unit 245, or the notification unit 247) described with reference to FIG. 3 may be implemented in the wireless communication interface 912. Alternatively, at least some of the constituent elements may be implemented in the processor 901 or the auxiliary controller 919. As one example, a module including a part or the whole of (for example, the BB processor 913) of the wireless communication interface 912, the processor 901, and/or the auxiliary controller 919 may be implemented on the smartphone 900. The one or more constituent elements in the module may be implemented in the module. In this case, the module may store a program causing a processor to function as the one or more constituent elements (in other words, a program causing the processor to execute operations of the one or more constituent elements) and execute the program. As another example, a program causing the processor to function as the one or more constituent elements may be installed in the smartphone 900, and the wireless communication interface 912 (for example, the BB processor 913), the processor 901, and/or the auxiliary controller 919 may execute the program. In this way, the smartphone 900 or the module may be provided as a device including the one or more constituent elements and a program causing the processor to function as the one or more constituent elements may be provided. In addition, a readable recording medium on which the program is recorded may be provided.

Further, in the smartphone 900 illustrated in FIG. 23, for example, the wireless communication unit 220 described with reference to FIG. 3 may be implemented in the wireless communication interface 912 (for example, the RF circuit 914). Further, the antenna unit 210 may be implemented in the antenna 916. Further, the storage unit 230 may be implemented in the memory 902.

Second Application Example

FIG. 24 is a block diagram illustrating an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or an SoC, and controls the navigation function and the other functions of the car navigation apparatus 920. The memory 922 includes a RAM and a ROM, and stores a program executed by the processor 921 and data.

The GPS module 924 uses a GPS signal received from a GPS satellite to measure the position (e.g., latitude, longitude, and altitude) of the car navigation apparatus 920. The sensor 925 may include a sensor group including, for example, a gyro sensor, a geomagnetic sensor, a barometric sensor and the like. The data interface 926 is, for example, connected to an in-vehicle network 941 via a terminal that is not illustrated, and acquires data such as vehicle speed data generated on the vehicle side.

The content player 927 reproduces content stored in a storage medium (e.g., CD or DVD) inserted into the storage medium interface 928. The input device 929 includes, for example, a touch sensor which detects that a screen of the display device 930 is touched, a button, a switch or the like, and accepts operation or information input from a user. The display device 930 includes a screen such as LCDs and OLED displays, and displays an image of the navigation function or the reproduced content. The speaker 931 outputs a sound of the navigation function or the reproduced content.

The wireless communication interface 933 supports a cellular communication system such as LTE or LTE-Advanced, and performs wireless communication. The wireless communication interface 933 may typically include the BB processor 934, the RF circuit 935, and the like. The BB processor 934 may, for example, perform encoding/decoding, modulation/demodulation, multiplexing/demultiplexing, and the like, and performs a variety of types of signal processing for wireless communication. On the other hand, the RF circuit 935 may include a mixer, a filter, an amplifier, and the like, and transmits and receives a wireless signal via the antenna 937. The wireless communication interface 933 may be a one-chip module in which the BB processor 934 and the RF circuit 935 are integrated. The wireless communication interface 933 may include a plurality of BB processors 934 and a plurality of RF circuits 935 as illustrated in FIG. 24. Note that FIG. 24 illustrates an example in which the wireless communication interface 933 includes a plurality of BB processors 934 and a plurality of RF circuits 935, but the wireless communication interface 933 may include a single BB processor 934 or a single RF circuit 935.

Further, the wireless communication interface 933 may support other types of wireless communication system such as a short range wireless communication system, a near field communication system, and a wireless LAN system in addition to the cellular communication system, and in this case, the wireless communication interface 933 may include the BB processor 934 and the RF circuit 935 for each wireless communication system.

Each antenna switch 936 switches a connection destination of the antenna 937 among a plurality of circuits (for example, circuits for different wireless communication systems) included in the wireless communication interface 933.

Each of the antennas 937 includes one or more antenna elements (for example, a plurality of antenna elements constituting a MIMO antenna) and is used for transmission and reception of the wireless signal by the wireless communication interface 933. The car navigation apparatus 920 may include a plurality of antennas 937 as illustrated in FIG. 24. Note that FIG. 24 illustrates an example in which the car navigation apparatus 920 includes a plurality of antennas 937, but the car navigation apparatus 920 may include a single antenna 937.

Further, the car navigation apparatus 920 may include the antenna 937 for each wireless communication system. In this case, the antenna switch 936 may be omitted from a configuration of the car navigation apparatus 920.

The battery 938 supplies electric power to each block of the car navigation apparatus 920 illustrated in FIG. 24 via a feeder line that is partially illustrated in the figure as a dashed line. Further, the battery 938 accumulates the electric power supplied from the vehicle.

In the car navigation apparatus 920 illustrated in FIG. 24, one or more constituent elements included in the processing unit 240 (at least one of the communication control unit 241, the information acquisition unit 243, the measuring unit 245, or the notification unit 247) described with reference to FIG. 3 may be implemented in the wireless communication interface 933. Alternatively, at least some of the constituent elements may be implemented in the processor 921. As one example, a module including a part or the whole of (for example, the BB processor 934) of the wireless communication interface 933 and/or the processor 921 may be implemented on the car navigation apparatus 920. The one or more constituent elements in the module may be implemented in the module. In this case, the module may store a program causing a processor to function as the one or more constituent elements (in other words, a program causing the processor to execute operations of the one or more constituent elements) and execute the program. As another example, a program causing the processor to function as the one or more constituent elements may be installed in the car navigation apparatus 920, and the wireless communication interface 933 (for example, the BB processor 934) and/or the processor 921 may execute the program. In this way, the car navigation apparatus 920 or the module may be provided as a device including the one or more constituent elements and a program causing the processor to function as the one or more constituent elements may be provided. In addition, a readable recording medium on which the program is recorded may be provided.

Further, in the car navigation apparatus 920 illustrated in FIG. 24, for example, the wireless communication unit 220 described with reference to FIG. 3 may be implemented in the wireless communication interface 933 (for example, the RF circuit 935). Further, the antenna unit 210 may be implemented in the antenna 937. Further, the storage unit 230 may be implemented in the memory 922.

The technology of the present disclosure may also be realized as an in-vehicle system (or a vehicle) 940 including one or more blocks of the car navigation apparatus 920, the in-vehicle network 941, and a vehicle module 942. In other words, the in-vehicle system (or the vehicle) 940 may be provided as a device including at least one of the communication control unit 241, the information acquisition unit 243, the measuring unit 245, or the notification unit 247. The vehicle module 942 generates vehicle data such as vehicle speed, engine speed, and trouble information, and outputs the generated data to the in-vehicle network 941.

5. CONCLUDING REMARKS

As described above, in the communication system according to an embodiment of the present disclosure, the base station notifies information regarding an MBMS session (e.g., information such as timings at which beams are transmitted in each of a plurality of directions) to the terminal apparatus. In this case, the information is associated with information (e.g., system information) notified commonly to one or more terminal apparatuses within a communication range. The terminal apparatus controls in such a way that the content of the desired program is received on the basis of the information notified from the base station. As a specific example, the terminal apparatus recognizes the timing at which the beam for transmitting the content of the desired program is transmitted toward itself and receives the content depending on the timing on the basis of the information notified from the base station.

The configuration as described above makes it possible for the base station to deliver efficiently the content (the MBMS content) of the program desired to be delivered to each terminal apparatus within the communication range using a UE-specific beam. Such a configuration allows the communication system according to an embodiment of the present disclosure to improve the utilization efficiency of network resources, that is, to accommodate efficiently a terminal apparatus that desires to deliver MBMS content. The communication system according to an embodiment of the present disclosure thus allows an effect of further improving the throughput of the entire system to be expected.

The preferred embodiment of the present disclosure has been described above with reference to the accompanying drawings, whilst the technical scope of the present disclosure is not limited to the above examples. A person skilled in the art may obviously find various alterations and modifications within the scope of the technical idea described in the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

REFERENCE SIGNS LIST

10 Cell
40 Core network
50 Packet data network
60 Application server
100 Base station
110 Antenna unit
120 Wireless communication unit
130 Network communication unit
140 Storage unit
150 Processing unit
151 Communication control unit
153 Information acquisition unit
155 Notification unit
200 Terminal apparatus
210 Antenna unit
220 Wireless communication unit
230 Storage unit
240 Processing unit
241 Communication control unit
243 Information acquisition unit
245 Measuring unit
247 Notification unit
300 MEC server

The invention claimed is:

1. A communication apparatus comprising:
a transceiver configured to perform wireless communication;
a control circuitry operatively connected to the transceiver and configured to:
control delivery of content for each program using a directional beam,
notify a terminal apparatus of first information regarding a timing of transmitting the directional beam in each of a plurality of directions in association with second information notified commonly to one or more of the terminal apparatuses within a communication range,
acquires, from one or more of the terminal apparatuses within the communication range a request for delivering content for at least a part of one or more of the programs for each of the directional beams used for delivering the content,
notifies the terminal apparatus of fourth information depending on an acquisition state of the request for each of the directional beams for each of one or more of the programs in association with the second information, and
after notifying the terminal apparatus of the fourth information, acquires the request from the terminal apparatus.

2. The communication apparatus according to claim 1, wherein the first information includes information regarding a resource allocated depending on the timing.

3. The communication apparatus according to claim 1, wherein the second information is system information.

4. The communication apparatus according to claim 1, wherein the control circuitry, after notifying the terminal apparatus of the first information, controls in such a way as to execute sweeping of the directional beam to deliver the content corresponding to the program using the directional beam allocated individually for each of one or more of the programs.

5. The communication apparatus according to claim 4, wherein the control circuitry controls the sweeping of the directional beam individually for each of the programs.

6. The communication apparatus according to claim 5, wherein at least any one of a period of the sweeping, a number of the directional beams transmitted in the sweeping, or a direction of transmission of the directional beam in the sweeping is set for each of the programs.

7. The communication apparatus according to claim 4,
wherein the control circuitry controls in such a way,
before executing first sweeping that is the sweeping, as to execute second sweeping of a second directional beam different from a first directional beam that is the directional beam used for delivery of the content for each program, and
decides the first directional beam for transmitting the content for each program among a plurality of directional beams to the terminal apparatus on a basis of third information notified in response to a result of receiving the second direction beam from the terminal apparatus.

8. The communication apparatus according to claim 7, wherein the control circuitry controls the second sweeping to be executed commonly to a plurality of the programs.

9. The communication apparatus according to claim 7, wherein the second sweeping has a period that is set to be equal to or longer than a period of the first sweeping.

10. The communication apparatus according to claim 7, wherein the second directional beams transmitted in the second sweeping are set in numbers to be equal to or larger than the first directional beams transmitted in the first sweeping.

11. A communication apparatus comprising:
a transceiver configured to perform wireless communication; and
control circuitry operatively connected to the transceiver and configured to:
acquire, from a base station, second information associated with first information regarding a timing of transmitting a directional beam used for delivering content for each program in each of a plurality of directions, the second information being notified commonly to one or more terminal apparatuses within a communication range of the base station,
control in such a way as to receive the content for each program on a basis of the acquired first information,
notify the base station of third information in response to a result of receiving a second directional beam different from a first directional beam transmitted as the directional beam used for delivering the content for each program from the base station, and
after notifying the third information, controls in such a way as to receive the content for each program using the first directional beam.

12. The communication apparatus according to claim 11, wherein the control circuitry notifies the base station of the third information in a procedure for establishing communication with the base station.

13. The communication apparatus according to claim 12, wherein the control circuitry notifies the base station of the third information corresponding to the first directional beam on a basis of a sequence different for each of the first directional beams.

14. The communication apparatus according to claim 12, wherein the control circuitry controls the third information to be notified to the base station within a predetermined window.

15. The communication apparatus according to claim 14, wherein the window is set for each of the first directional beams.

16. A communication method executed by wireless communication device the method comprising:
performing wireless communication:
controlling delivery of content for each program using a directional beam;
notifying: a terminal apparatus of first information regarding a timing of transmitting the directional beam in each of a plurality of directions in association with second information notified commonly to one or more of the terminal apparatuses within a communication range;
acquiring, from one or more of the terminal apparatuses within the communication range, a request for delivering content for at least a part of one or more of the programs for each of the directional beams used for delivering the content,
notifying the terminal apparatus of fourth information depending on an acquisition state of the request for each of the directional beams for each of one or more of the programs in association with the second information, and
after notifying the terminal apparatus of the fourth information acquiring the request from the terminal apparatus.

17. A communication method executed by a wireless communication device, the method comprising:
performing wireless communication;
acquiring, from a base station, second information associated With first information regarding a timing of transmitting a directional beam used for delivering content for each program in each of a plurality of directions, the second information being notified commonly to one or more terminal apparatuses within a communication range of the base station;
controlling in such a way as to receive the content for each program on a basis of the acquired first information;
notifying the base station of third information in response to a result of receiving a second directional beam different from a first directional beam transmitted as the directional beam used for delivering the content for each program from the base station, and
after notifying the third information, controlling in such a way as to receive the content for each program using the first directional beam.

18. A non-transitory computer readable product containing instructions configured to cause a wireless communication device to perform a method, the method comprising:
performing wireless communication;
controlling delivery of content for each program using a directional beam;
notifying a terminal apparatus of first information regarding a timing of transmitting the directional beam in each of a plurality of directions in association with second information notified commonly to one or more of the terminal apparatuses within a communication range;
acquiring, from one or more of the terminal apparatuses within the communication range, a request for delivering content for at least a part of one or more of the programs for each of the directional beams used for delivering the content,
notifying the terminal apparatus of fourth information depending on an acquisition state of the request for each of the directional beams for each of one or more of the programs in association with the second information, and after notifying the terminal apparatus of the fourth information, acquiring the request from the terminal apparatus.

19. A non-transitory computer readable product containing instructions configured to cause a wireless communication device to perform a method, the method comprising;

performing wireless communication;

acquiring, from a base station, second information associated with first information regarding a timing of transmitting a directional beam used for delivering content for each program in each of a plurality of directions, the second information being notified commonly to one or more terminal apparatuses within a communication range of the base station;

controlling in such a way as to receive the content for each program on a basis of the acquired first information;

notifying the base station of third information in response to a result of receiving a second directional beam different from a first directional beam transmitted as the directional beam used for delivering the content for each program from the base station, and after notifying the third information, controlling in such a way as to receive the content for each program using the first directional beam.

\* \* \* \* \*

UNITED STATES PATENT AND TRADEMARK OFFICE
CERTIFICATE OF CORRECTION

| | | |
|---|---|---|
| PATENT NO. | : 11,284,222 B2 | Page 1 of 1 |
| APPLICATION NO. | : 16/770075 | |
| DATED | : March 22, 2022 | |
| INVENTOR(S) | : Hiroaki Takano | |

It is certified that error appears in the above-identified patent and that said Letters Patent is hereby corrected as shown below:

In the Claims

Column 34, Claim 1, Line 43, "acquires" should be --acquire--;
Column 34, Claim 1, Line 48, "notifies" should be --notify-- and "fourth" should be --third--;
Column 34, Claim 1, Line 53, "fourth" should be --third--.

Column 36, Claim 16, Line 21, "fourth" should be --third--;
Column 36, Claim 26, Line 21, "fourth" should be --third--;
Column 36, Claim 18, Line 66, "fourth" should be --third--.

Column 37, Claim 18, Line 4, "fourth" should be --third--.

Signed and Sealed this
Tenth Day of May, 2022

*Katherine Kelly Vidal*

Katherine Kelly Vidal
*Director of the United States Patent and Trademark Office*